(12) United States Patent
Petrofsky

(10) Patent No.: US 11,851,221 B2
(45) Date of Patent: Dec. 26, 2023

(54) SYSTEMS AND METHODS FOR PRODUCING A RADIOACTIVE DRUG PRODUCT USING A DISPENSING UNIT

(71) Applicant: Curium US LLC, St. Louis, MO (US)

(72) Inventor: Bryan Scott Petrofsky, St. Louis, MO (US)

(73) Assignee: Curium US LLC, St. Louis, MO (US)

( * ) Notice: Subject to any disclaimer, the term of this patent is extended or adjusted under 35 U.S.C. 154(b) by 0 days.

(21) Appl. No.: 18/088,007

(22) Filed: Dec. 23, 2022

(65) Prior Publication Data

US 2023/0339631 A1 Oct. 26, 2023

Related U.S. Application Data

(60) Provisional application No. 63/333,285, filed on Apr. 21, 2022.

(51) Int. Cl.
| | |
|---|---|
| *B65B 3/00* | (2006.01) |
| *B65B 3/14* | (2006.01) |
| *B65B 7/28* | (2006.01) |
| *B65B 43/50* | (2006.01) |
| *B65B 57/14* | (2006.01) |
| *B65B 57/18* | (2006.01) |

(52) U.S. Cl.
CPC ............... *B65B 3/003* (2013.01); *B65B 3/14* (2013.01); *B65B 7/285* (2013.01); *B65B 43/50* (2013.01); *B65B 57/145* (2013.01); *B65B 57/18* (2013.01)

(58) Field of Classification Search
CPC ..................................................... B65B 3/003
See application file for complete search history.

(56) References Cited

U.S. PATENT DOCUMENTS 2,658,656 A * 11/1953 Halahan ................. B65B 3/003
                                                                141/276
3,707,173 A * 12/1972 Lewis ..................... B65B 3/003
                                                                141/157

(Continued)

FOREIGN PATENT DOCUMENTS

| CN | 207243428 U | 4/2018 |
|---|---|---|
| CN | 113306756 A * | 8/2021 |

(Continued)

OTHER PUBLICATIONS

Translation of DU CN 113306756 (Year: 2021).*

(Continued)

*Primary Examiner* — Nathaniel C Chukwurah
*Assistant Examiner* — Lucas E. A. Palmer
(74) *Attorney, Agent, or Firm* — Armstrong Teasdale LLP

(57) ABSTRACT

Production systems for producing a radioactive drug product include a hot cell having a radiation isolating shielding and a dispensing unit positioned within the hot cell. The dispensing unit includes a manipulator arm for manipulating a closure component of a vial. The system further includes a pneumatic line extending from the manipulator arm and through the radiation isolating shielding to a location outside of the hot cell and a pressure sensor connected to the pneumatic line and positioned outside of the radiation isolating shielding. The pressure sensor is operable to detect air pressure within the pneumatic line.

15 Claims, 27 Drawing Sheets

(56) References Cited

U.S. PATENT DOCUMENTS

| | | | |
|---|---|---|---|
| 3,730,235 A * | 5/1973 | Lewis | B65B 3/003 |
| | | | 198/346.2 |
| 4,361,162 A | 11/1982 | Brisebarre | |
| 4,615,165 A | 10/1986 | Gamberini | |
| 5,341,854 A | 8/1994 | Zezulka | |
| 6,102,324 A | 8/2000 | Farrow | |
| 6,315,004 B1 | 11/2001 | Wellman | |
| RE39,747 E | 7/2007 | Lankin | |
| 7,412,814 B2 * | 8/2008 | Rice | B65B 5/103 |
| | | | 53/494 |
| 7,610,115 B2 * | 10/2009 | Rob | B65B 3/003 |
| | | | 700/239 |
| 7,758,638 B2 | 7/2010 | Sievers | |
| 7,900,658 B2 * | 3/2011 | Osborne | B01F 35/422 |
| | | | 604/407 |
| 7,905,258 B2 | 3/2011 | Bedeschi | |
| 7,913,720 B2 * | 3/2011 | Tribble | B65B 59/003 |
| | | | 604/407 |
| 8,003,967 B2 | 8/2011 | Fago | |
| 8,181,677 B2 | 5/2012 | Li | |
| 8,807,177 B2 * | 8/2014 | Strangis | B63C 9/0005 |
| | | | 604/416 |
| 9,139,316 B2 * | 9/2015 | Husnu | A61J 1/2006 |
| 9,216,831 B2 | 12/2015 | Zanelli | |
| 9,281,186 B2 | 3/2016 | Wootton | |
| 9,555,189 B2 * | 1/2017 | Reisinger | A61M 5/16827 |
| 9,697,335 B2 * | 7/2017 | Joplin | G16H 20/13 |
| 9,789,986 B2 * | 10/2017 | Procyshyn | B65B 43/46 |
| 9,920,991 B2 | 3/2018 | Watterodt | |
| 9,937,100 B1 * | 4/2018 | Joplin | B65B 61/20 |
| 9,993,815 B2 * | 6/2018 | Immerzeel | C12M 29/00 |
| 10,022,266 B2 | 7/2018 | Claret | |
| 10,053,248 B2 * | 8/2018 | Joplin | B65B 35/56 |
| 10,196,253 B2 * | 2/2019 | Clüsserath | B67C 7/0046 |
| 10,261,940 B2 * | 4/2019 | Procyshyn | G06F 1/1632 |
| 10,364,053 B2 * | 7/2019 | Wensley | B65B 7/2821 |
| 10,589,973 B2 | 3/2020 | Nicholson | |
| 10,865,004 B2 | 12/2020 | Tanner | |
| 11,129,936 B2 | 9/2021 | Gibson | |
| 11,193,419 B2 | 12/2021 | Thompson | |
| 11,304,356 B2 | 4/2022 | Weis | |
| 11,634,242 B1 * | 4/2023 | Dibble | B67C 7/0033 |
| | | | 53/317 |
| 2002/0020459 A1 * | 2/2002 | Baldwin | B65B 3/006 |
| | | | 141/11 |
| 2003/0103839 A1 * | 6/2003 | Osborne | B65B 69/00 |
| | | | 414/411 |
| 2004/0154690 A1 * | 8/2004 | Osborne | B65B 7/2821 |
| | | | 141/27 |
| 2005/0005990 A1 | 1/2005 | Williams | |
| 2005/0051661 A1 | 3/2005 | Faulhammer | |
| 2005/0278066 A1 * | 12/2005 | Graves | G21F 5/015 |
| | | | 700/239 |
| 2006/0151048 A1 * | 7/2006 | Tochon-Danguy | G21F 5/015 |
| | | | 141/27 |
| 2006/0259195 A1 * | 11/2006 | Eliuk | B01F 33/8442 |
| | | | 700/245 |
| 2008/0004480 A1 | 1/2008 | Bedeschi | |
| 2008/0233653 A1 | 9/2008 | Hess | |
| 2009/0108018 A1 * | 4/2009 | Li | G21G 1/0005 |
| | | | 221/156 |
| 2010/0206425 A1 | 8/2010 | Tartaglia | |
| 2011/0240089 A1 | 10/2011 | Wootton | |
| 2012/0216913 A1 * | 8/2012 | Pacetti | A61F 2/86 |
| | | | 141/18 |
| 2013/0180618 A1 * | 7/2013 | Py | A61J 1/1406 |
| | | | 141/2 |
| 2013/0283733 A1 * | 10/2013 | Py | B65B 51/02 |
| | | | 53/425 |
| 2014/0017044 A1 | 1/2014 | Hawkes | |
| 2014/0238542 A1 * | 8/2014 | Kvale | B65B 3/003 |
| | | | 141/329 |
| 2014/0263147 A1 * | 9/2014 | Py | A61J 1/2096 |
| | | | 141/2 |
| 2015/0113918 A1 * | 4/2015 | Ehmer | B41J 11/0015 |
| | | | 53/111 R |
| 2016/0068283 A1 * | 3/2016 | Py | B29C 45/006 |
| | | | 53/425 |
| 2017/0028130 A1 * | 2/2017 | Perazzo | B67B 3/2006 |
| 2017/0227946 A1 * | 8/2017 | Nicholson | B23P 21/004 |
| 2018/0148200 A1 * | 5/2018 | Graves | G21F 7/068 |
| 2021/0187467 A1 | 6/2021 | Eshima | |
| 2021/0343436 A1 | 11/2021 | Morikawa | |
| 2022/0063929 A1 | 3/2022 | Nicholson | |
| 2022/0185510 A1 * | 6/2022 | Hoffman | B65B 61/20 |

FOREIGN PATENT DOCUMENTS

| | | |
|---|---|---|
| CN | 113306756 A | 8/2021 |
| EP | 0410645 A2 | 1/1990 |
| EP | 510027 A1 | 10/1992 |
| EP | 355701 B1 | 3/1993 |
| EP | 837758 A1 | 4/1998 |
| EP | 824452 B1 | 3/1999 |
| EP | 1225679 B1 | 8/2004 |
| EP | 1076085 B1 | 5/2006 |
| EP | 1860029 A1 | 11/2007 |
| EP | 1936784 B1 | 7/2009 |
| EP | 2302566 B1 | 3/2013 |
| EP | 2592005 A1 * | 5/2013 |
| EP | 1825878 B1 | 4/2017 |
| EP | 2916326 B1 | 9/2017 |
| EP | 3180663 B1 | 4/2019 |
| EP | 2691744 B1 | 11/2019 |
| EP | 3470811 B1 | 4/2020 |
| EP | 3643327 A2 | 4/2020 |
| EP | 3549143 B1 | 11/2020 |
| EP | 3741688 A2 | 11/2020 |
| EP | 3871699 A1 | 9/2021 |
| EP | 3894498 A1 | 10/2021 |
| EP | 3928267 A1 | 12/2021 |
| EP | 3003431 B1 | 3/2022 |
| EP | 3972655 A1 | 3/2022 |
| WO | WO-9111093 A1 * | 7/1991 |
| WO | 1993011017 A1 | 6/1993 |
| WO | 9702931 A1 | 1/1997 |
| WO | WO-03022314 A2 * | 3/2003 |
| WO | 2003064691 A2 | 8/2003 |
| WO | 2008134867 A1 | 11/2008 |
| WO | 2010125454 A1 | 11/2010 |
| WO | 2014124828 A1 | 8/2014 |
| WO | WO-2015151339 A1 * | 10/2015 |
| WO | 2017158100 A1 | 9/2017 |
| WO | 2021195749 A1 | 10/2021 |
| WO | 2021239585 A1 | 12/2021 |
| WO | 2022078658 A1 | 4/2022 |

OTHER PUBLICATIONS

CLIO Volumetric Dispensing System for Radiopharmaceuticals, COMECER, at URL: http://comecer.com/clio-volumetric-dispenser-radiopharmaceuticals.

Extended European Search Report issued in EP application No. 23168493.7 dated Sep. 11, 2023, pp. 1-7.

* cited by examiner

SYSTEMS AND METHODS FOR PRODUCING A RADIOACTIVE DRUG PRODUCT USING A DISPENSING UNIT

CROSS-REFERENCE TO RELATED APPLICATION

This application claims the benefit of U.S. Provisional Patent Application No. 63/333,285, filed Apr. 21, 2022, which is incorporated herein by reference in its entirety.

FIELD

The field relates generally to production of radioactive drug products and, more particularly, to a dispensing unit for use in systems and methods for preparing parenteral radioactive drug products.

BACKGROUND

Radiopharmaceuticals, drug products that incorporate a radioactive element (e.g., a radioisotope), are typically used in nuclear medicine for diagnostic and/or therapeutic purposes. Radioisotopes may be produced by direct production (e.g., proton- or neutron-induced reactions using particle beams).

In the production of some radioactive drug products, a dispenser is used to dispense the drug product into a vial. For example, in some systems an open vial is provided to a dispenser having a needle, the drug product is dispensed into the vial through the needle, and a closure is thereafter applied to the vial. However, aseptic production systems incorporating such dispensers provide the vials to the dispensers in an open state, only closing the vial after the drug product is dispensed into the vial. As a result, such systems expose the interior of the vial to the isolator environment during staging, which can potentially affect the sterility assurance or non-viable contamination of the final drug product if microbial or other ingress occurs during processing.

Additionally, prior art dispensing systems may remove uncrimped caps and stoppers prior to filling by moving the vials through a series of stations for undressing the uncrimped caps and stoppers. However, such systems generally require a large footprint to accommodate the different stations for undressing. Such systems are not well suited for use in a hot cell because they leave little space in the hot cell for redundant systems in the event of a failure. Additionally, such systems may include automation-enabling sensors and electronics that are sensitive to radiation and not well suited for operation in a high-radiation environment. Accordingly, a need exists for systems and methods that facilitate automatically dispensing a radioactive parenteral drug product from a compact apparatus into a vial, while minimizing the possibility of viable and non-viable contamination of the drug product and minimizing detrimental effects of ionizing radiation on equipment controls.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a production system for producing a radioactive drug product includes a hot cell having a radiation isolating shielding and a dispensing unit positioned within the hot cell. The dispensing unit includes a manipulator arm for manipulating a closure component of a vial. The system further includes a pneumatic line extending from the manipulator arm and through the radiation isolating shielding to a location outside of the hot cell and a pressure sensor connected to the pneumatic line and positioned outside of the radiation isolating shielding. The pressure sensor is operable to detect air pressure within the pneumatic line.

In another aspect, a control system for controlling a dispensing unit positioned within a hot cell having a radiation isolating shielding is provided. The dispensing unit is operable to dispense a radioactive drug into a vial and includes an arm for manipulating a closure component of the vial. The control system is positioned outside of the radiation isolating shielding and includes a pressure sensor connected to a pneumatic line extending to the arm of the dispensing unit. The pressure sensor is operable to measure air pressure within the pneumatic line. The control system further includes a controller communicatively coupled to the pressure sensor. The controller is electrically connected to the dispensing unit and configured to control operation of the dispensing unit based on the measured air pressure.

In yet another aspect, a method for producing a radioactive drug product includes positioning a vial on a dispensing unit positioned within a hot cell having a radiation shielding. The dispensing unit includes a manipulator arm for manipulating a closure component of the vial. The method further includes controlling, by a controller, the manipulator arm to engage the closure component of the vial and receiving a detected air pressure at the controller from a pressure sensor connected to a pneumatic line at a location outside of the hot cell. The pneumatic line extends from the manipulator arm and through the radiation shielding. The method further includes determining, by the controller, whether the manipulator arm is engaged with the closure component based on the detected air pressure.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
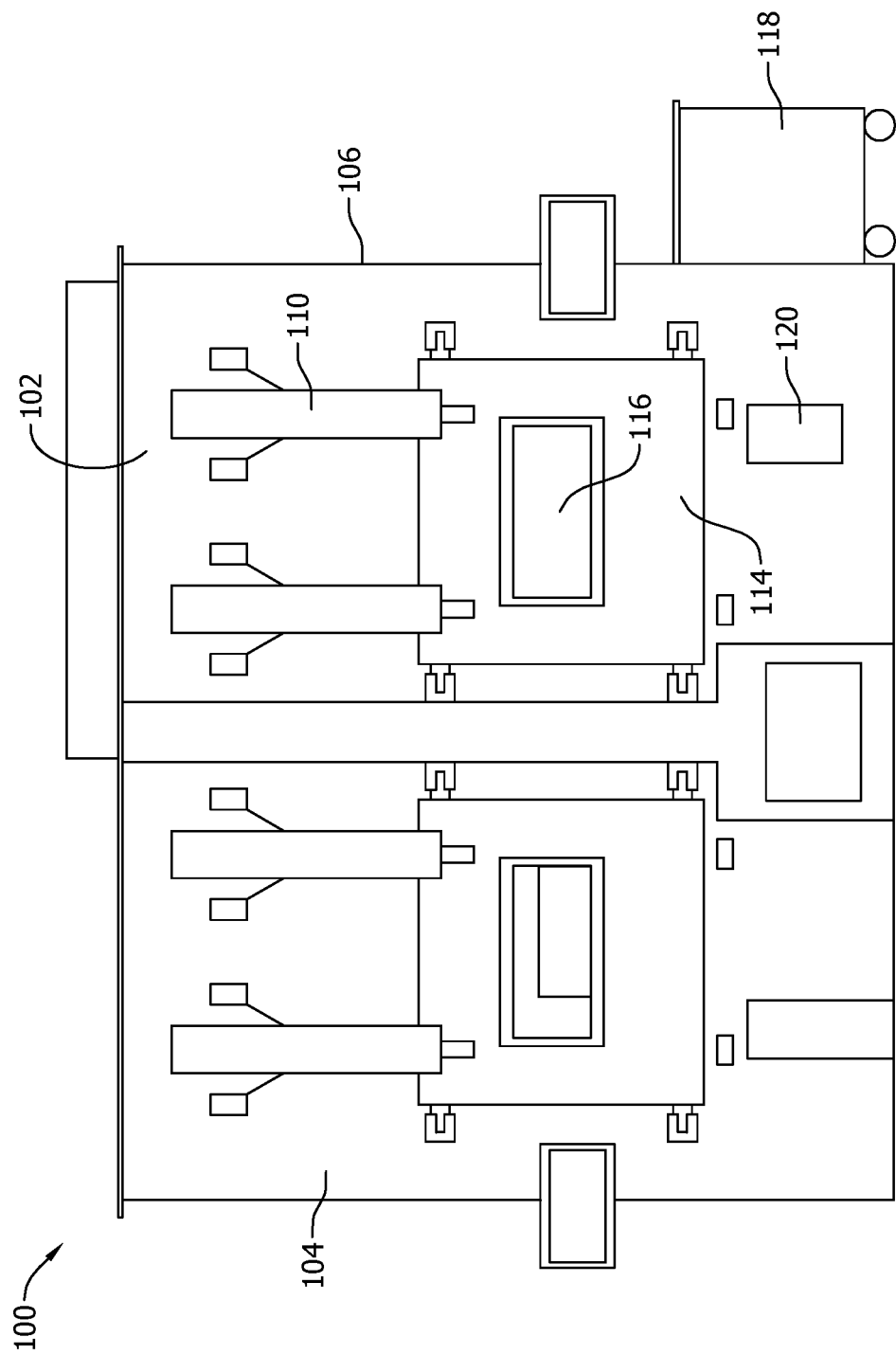
FIG. 1 is a front view of a production system for aseptically producing a radioactive parenteral drug product.

FIG. 1 is a front view of a production system 100 for aseptically producing a radioactive drug product. In the embodiment of FIG. 1, production system 100 is particularly suited for producing radioactive parenteral drug products that are used for research and development purposes. In other embodiments, the production system 100 may be a production system 100 used for pharmaceutical aseptic commercial manufacturing of parenteral radioactive drug products.

The production system 100 includes a housing 102 containing a formulation hot cell 104 for formulating and diluting the drug product and a dispensing hot cell 106 for filling vials 101 with the radioactive drug product, therein. In other embodiments, the formulation hot cell 104 and dispensing hot cell 106 may be within separate housings. Hot cells 104, 106 generally include an enclosure constructed of nuclear radiation shielding material designed to shield the surrounding environment from nuclear radiation. Suitable shielding materials for hot cells 104, 106 include, for example and without limitation, lead, depleted uranium, and tungsten. In some embodiments, hot cells 104, 106 are constructed of stainless steel-clad lead walls forming a cuboid or rectangular prism.

Figure 2:
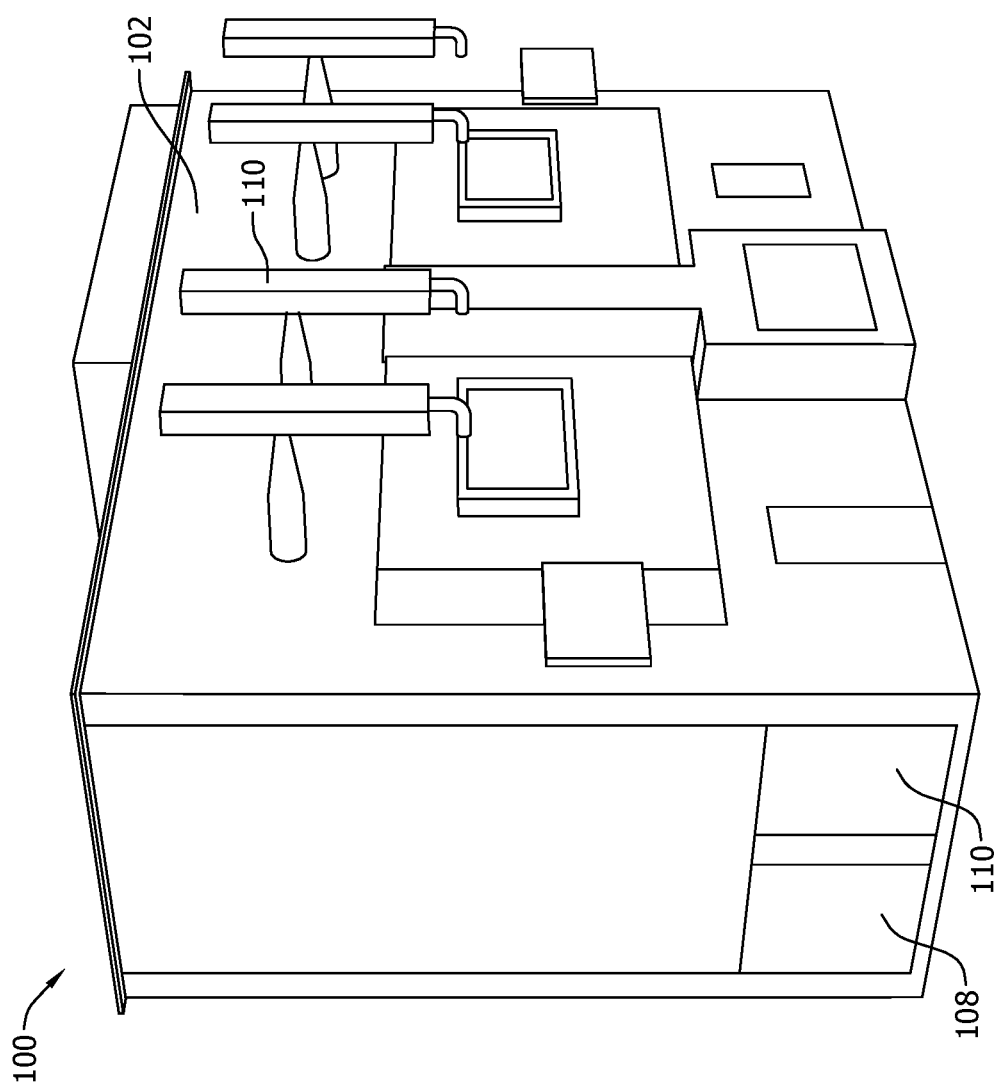
FIG. 2 is a perspective view of the production system of FIG. 1.

The formulation cell 104 is used to introduce a reconstituted radioactive material to formulate a radioactive drug product, such as, by radiolabeling for example. In the example, the radioactive material is the Copper-64 isotope, though other suitable radioactive materials may be used. As shown in FIG. 2, the housing 102 includes a solid waste loading door 108 and a decayed solid waste unloading door 109. Radioactive bulk material is introduced into the formulation cell 104 by removing a shielding lid (not shown) of the housing 102. After the drug product is formulated, the drug product is held within a vessel (not shown) within the formulation cell 104, is filtered through a 0.2 micron filter, and pumped into the dispensing hot cell 106 to be dispensed into vials 101 (shown in FIG. 3).

Referring to FIG. 2, the production system 100 further includes a plurality of manipulators 110 or "telemanipulators" coupled to housing 102 for controlling respective manual arms (not shown) provided within the dispensing and filling hot cells 104, 106. In particular, in the embodiment of FIG. 2, two manipulators 110 are included for the formulation hot cell 104 and two manipulator are included for the dispensing hot cell 106, though in other embodiments, any suitable number of manipulators 110 may be used. In other embodiments the manual arms 112 within the respective hot cells 104, 106 may be automatically controlled, similar to the robotic arms 126 (shown in FIG. 3) described in greater detail below.

Referring back to FIG. 1, each of the hot cells 104, 106 includes a door 114 having a window 116 thereon. The doors 114 are used to access the respective hot cells 104, 106 for servicing of the interior of the hot cells 104, 106. The windows 116 enable visual access into the hot cells 104, 106 for an operator at the manipulators 110 and are constructed of a translucent shielding material. Suitable materials from which viewing windows 116 may be constructed include, for example and without limitation, lead glass. A shielded cart 118 receives empty vials 101 (shown in FIG. 3) into the dispensing hot cell 106 and removes the filled vials 101 from the hot cell, while shielding an operator from radiation emitted from the radioactive drug product in the vials 101. The housing 102 further includes a sample drawer 120 that provides access to the dispensing hot cell 106. As explained in greater detail below, the sample drawer 120 may be used to safely remove any number of vials 101 from the dispensing hot cell 106 chamber by directing each vial 101 (one at a time) into a removable shielded container 250 (shown in FIG. 26). Vials 101 can be removed for any reason, such as for quality control purposes.

Figure 3:
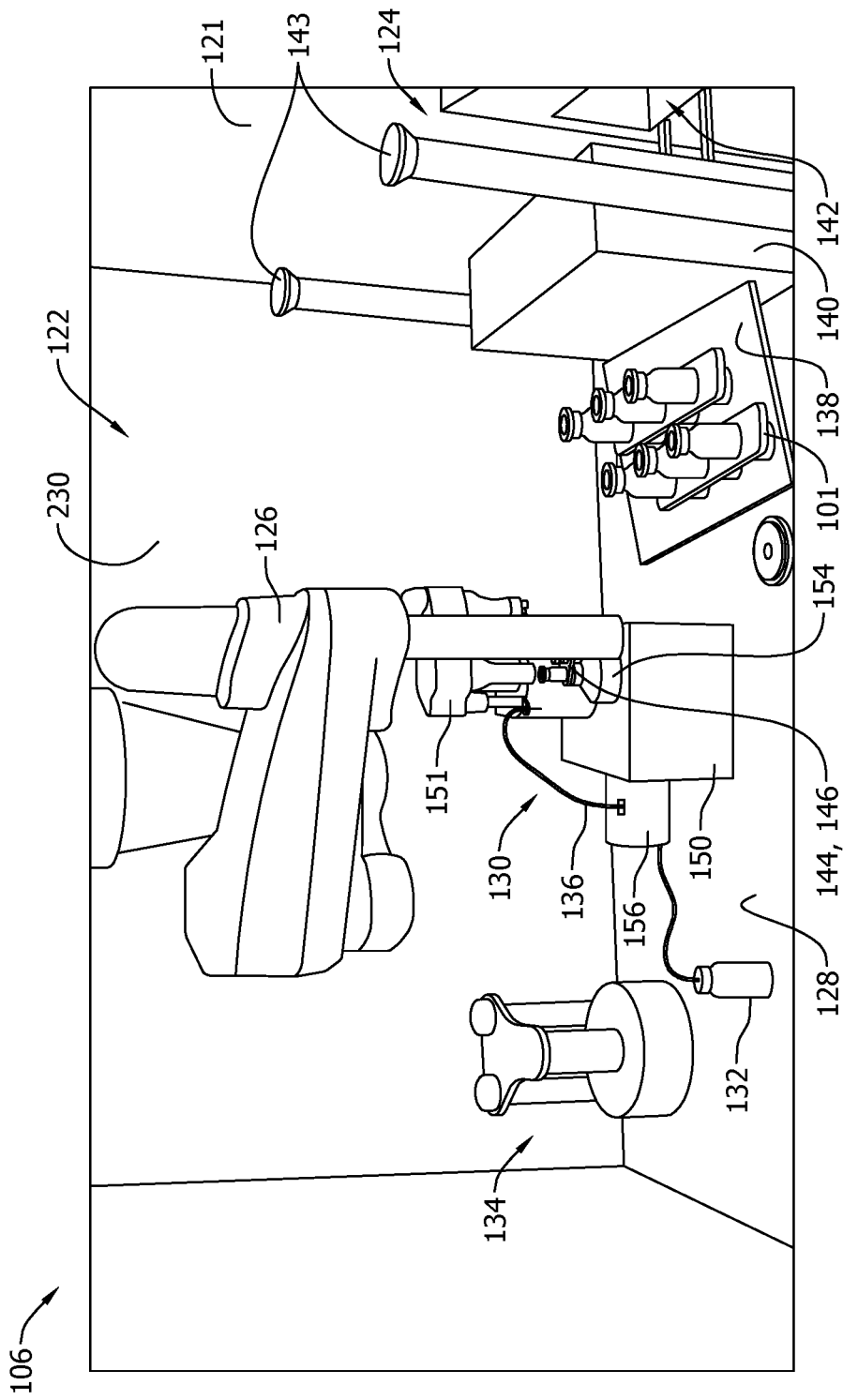
FIG. 3 is a perspective view of a dispensing hot cell of the production system of FIG. 1, with portions removed to reveal an interior region of the dispensing hot cell.

FIG. 3 is a perspective view of a portion of the dispensing hot cell 106, with portions of the shielding 121 removed to reveal an interior region 122 of the dispensing hot cell 106. The dispensing hot cell 106 includes a tray loading assembly 124, a robotic arm 126, a table 128, a dispensing unit 130, a supply vessel 132, a dose calibrator 134, and the sample drawer 120, all at least partially positioned within the shielding 121 of the dispensing hot cell 106. The table 128 provides a work surface supporting the dispensing unit 130 and portions of the tray loading assembly 124 thereon. A flexible bottle tubing 136 extends from the supply vessel 132 to the dispensing unit 130 for delivering the radioactive drug product provided by the formulation hot cell 104 to the dispensing unit 130.

The dispensing hot cell 106 receives, by the tray loading assembly 124, a tray 138 of empty vials 101 through an opening 142 defined within the shielding 121. The vials 101 each include stoppers 174 and loose crimp caps 176 (shown in FIG. 4) seated on top of the vials 101. The stoppers 174 and caps 176 are broadly referred to herein as "closure components." The tray 138 is provided to the tray loading assembly 124 by the shielded cart 118 (shown in FIG. 1) and is moved from the cart 118 and into a filling position, as shown in FIG. 3. The tray 138 can also be manually loaded by operators through the door 114 (shown in FIG. 1) of the dispensing hot cell 106. The tray loading assembly 124 includes a moveable radiation-shielded guillotine-style door 140 which provides a backstop to prevent movement of the tray 138 when the tray 138 is in the filling position, and which also prevents radiation from streaming through the opening 142. The door 140 is coupled to a pair of actuators 143 for raising and lowering the door 140 during operation.

The robotic arm 126 is moveable within the interior region 122 of the dispensing hot cell 106 and includes a pair of selectively moveable vial grippers 144, 146 for carrying the vials 101 between the tray 138, the dispensing unit 130, the dose calibrator 134, and the sample drop chute 248 (shown in FIG. 26), as described in greater detail below. The robotic arm 126 is in communication with a controller, such as the controller 184 (shown in FIG. 10A) that controls movement of the arm based on predefined instructions and outputs from various sensors. In some embodiments, the system 100 includes a dedicated controller (not shown) that is used for controlling operations of the robotic arm 126 and that is separate from the controller 184. In the example embodiment, the robotic arm 126 is controlled automatically, though in other embodiments the robotic arm 126 may be controlled manually.

The dispensing unit 130 is positioned on the table 128 and includes a body 150, a head 151 moveably attached to the body 150, a pedestal 154 attached to the body 150, also referred to as a "load cell pedestal", and a pump 156 attached to the body 150. The tubing 136 extends from the supply vessel 132, through the pump 156 and to the head 151 of the dispensing unit 130. In the embodiment of FIG. 3, the pump 156 is a peristaltic pump, though other suitable pumps may also be used. In some embodiments, a sterilizing filter (not shown) is fluidly connected to the tubing 136 between the supply vessel 132 and the dispensing unit 130, or more specifically, a needle 206 (shown in FIG. 17) of the dispensing unit 130. In such embodiments, the filter ensures sterility of the drug product during filling. The pedestal 154 receives the vials 101 from the robotic arm 126 and the dispensing unit 130 dispenses the radioactive drug product into the vials 101 on the pedestal 154.

Although a single dispensing unit 130 is shown, in other embodiments multiple dispensing units may be included within the dispensing hot cell 106, for example to provide redundancy during operation. Additionally or alternatively, the dispensing unit 130 may include other components. For example, in one embodiment the dispensing unit 130 may include two or more of at least one of the crimp arm 162, the cap removal arm 164, the stopper removal arm 166, and the filling arm 168, the pump 156, and/or the pedestal 154. In such embodiments, the other components may be independently actuated and controlled, such that dispensing operations may continue in the event of a component failure.

Although described with respect to an R&D drug production system 100, in other embodiments the dispensing unit 130 may be used in alternative production systems, such as a system for the pharmaceutical aseptic commercial manufacturing of parenteral radioactive drug products (i.e., production systems having sterility assurance for commercially dispensed parenteral drug products consistent with current good manufacturing practices).

Figure 4:
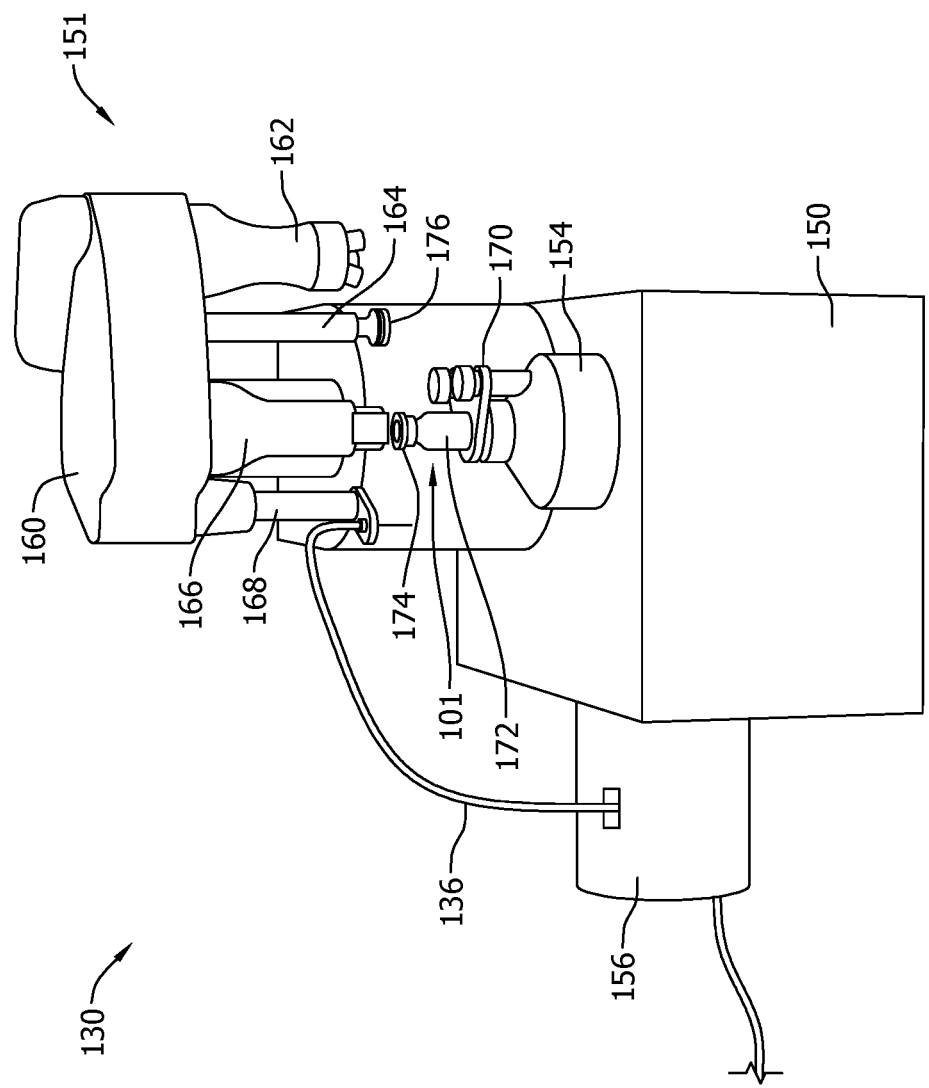
FIG. 4 is a perspective view of a dispensing unit in the dispensing hot cell of FIG. 3.

Referring to FIG. 4, the head 151 of the dispensing unit 130 includes a carriage 160 rotatably connected to the body 150. The dispensing unit 130 further includes a plurality of arms 162, 164, 166, 168 attached to the carriage 160 and extending downward from the carriage 160 and towards the body 150.

As shown in FIG. 4, a vial 101 is received on the pedestal 154 and held by a vial lock assembly 170 of the dispensing unit 130. The vial 101 includes a body 172, a stopper 174, and a cap 176. In FIG. 4, the cap 176 is shown removed off of the vial 101 and on the cap removal arm 164. The stopper 174 and the cap 176 seal the contents of the vial 101 to prevent leakage and contamination of the vial 101. In the example embodiment the cap 176 is a crimping cap and the stopper 174 is made of an elastomer. The vials 101 are 10 milliliter vials, though in other embodiments any suitable vials may be used.

Prior to introduction into the dispensing hot cell 106, the vials 101 are sterilized, e.g., by an autoclave, and are sealed with the stopper 174 seated on top of the body of the vial 101 and the cap 176 loosely placed on top of the stopper. This configuration of the vial 101 is generally referred to herein as being "dressed". Introducing the vials 101 into the dispensing hot cell 106 in the dressed configuration facilitates a reduced component and equipment footprint inside of the hot cell 106, while also reducing the potential that viable or non-viable contamination enters the vials 101. In some embodiments, the vials 101 are pre-sterilized, hung in the hot cell 106, unpackaged inside of the hot cell 106 using glove ports (not shown) or manipulators 110 (shown in FIG. 1), and placed individually onto the tray 138.

During filling operations, the dispensing unit 130 receives the dressed vials 101, undresses the vials 101 by removing the cap 176 and the stopper 174, fills the vials 101 with the radioactive drug product, and redresses the vials 101 by reapplying the stopper 174 and the cap 176 to the vial 101, and then crimping the cap 176 closed. As a result, the interior of the vials 101 are only exposed during the filling process, reducing the possibility of viable or non-viable contamination in a parenteral drug filling application.

Figure 5:
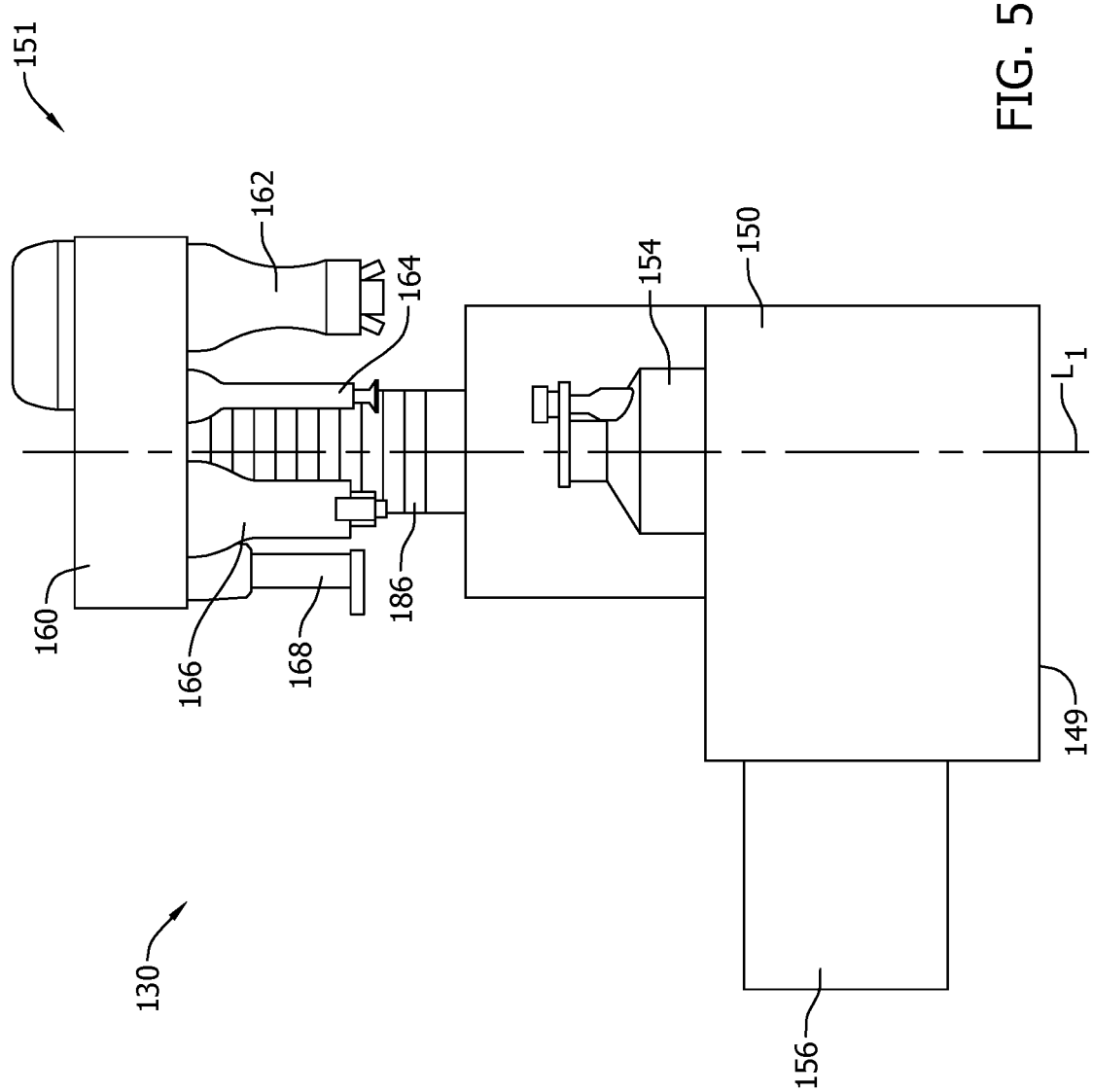
FIG. 5 is a front view of the dispensing unit shown in FIG. 4.

Referring to FIG. 5, the dispensing unit 130 defines a longitudinal axis $L_1$ extending through the body 150 and the carriage 160. The dispensing unit 130 further includes a moveable neck 186 connecting the head 151 of the dispensing unit 130 to the body 150. The neck 186 is moveable along the longitudinal axis $L_1$ for selectively positioning the arms 162-168 respectively in close position and/or contact with the vial 101 (shown in FIG. 4) on the pedestal 154. In particular, the neck 186 is movable between a retracted position, as shown in FIG. 4, an extended position as shown in FIG. 5, and/or any other position longitudinally between the retracted and extended positions. The head 151 is further rotatable relative to the body 150 about the longitudinal axis $L_1$ for moving the arms 162-168 relative to the vial 101. In some embodiments, the dispensing unit 130 further includes feet (not shown) attached to a bottom wall 149 of the body 150. In such embodiments, the feet raise the body 150 off the table 128 a height, such as one inch, such that the bottom wall 149, and the dispensing unit 130 more generally, is level on the table 128. Raising the body 150 above the tabletop also provides a pathway for sterilizing gases, such as vaporized hydrogen peroxide (VHP), to reach areas below the dispenser body 150 during decontamination.

Figure 6:
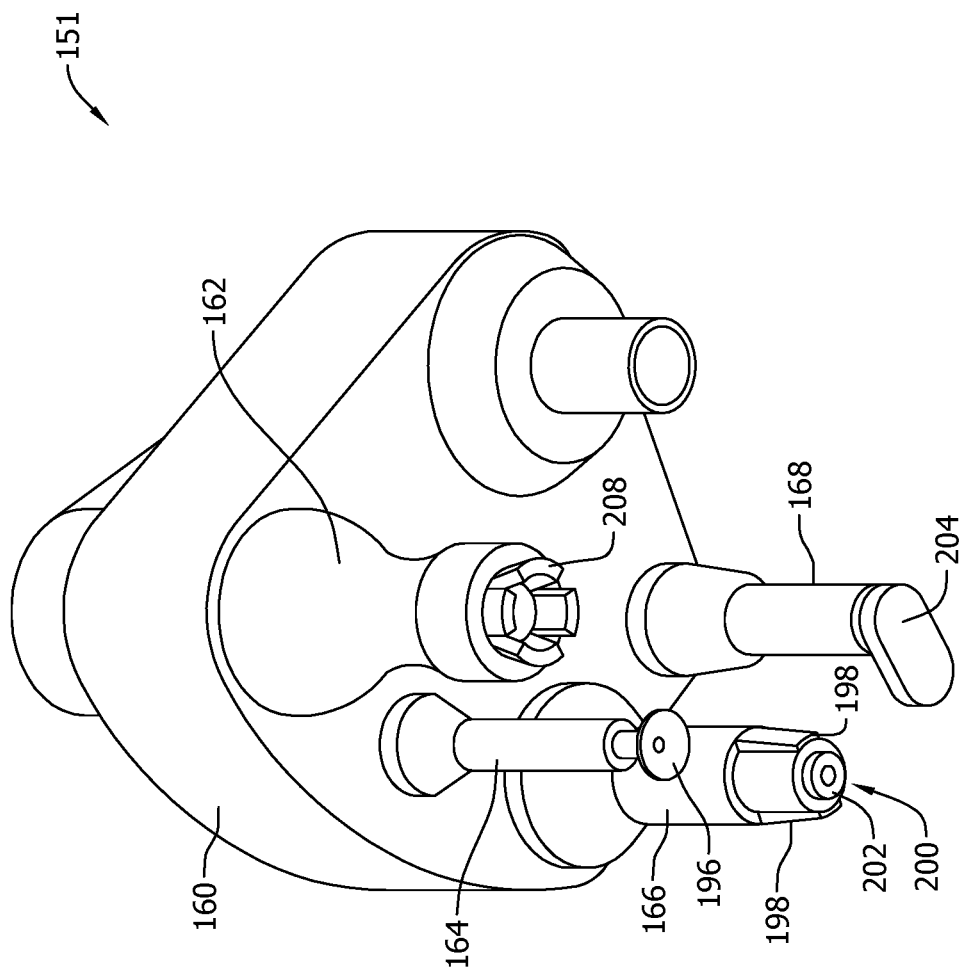
FIG. 6 is a perspective view of a head of the dispensing unit shown in FIG. 5.

Referring to FIG. 6, the arms 162-168 extending from the carriage 160 of the dispensing unit 130 include a crimp arm 162, a cap removal arm 164, a stopper removal arm 166, and a filling arm 168. The cap removal arm 164 includes a suction cup 196 for grabbing the cap 176 off the vial 101 and holding the cap 176 while the vial 101 is filled. The stopper removal arm 166 includes a pair of grippers 198 that are pneumatically controlled to physically grab that stopper 174 (shown in FIG. 4). A tip 200 of the stopper removal arm 166 also includes a suction port 202 which is used for detecting the presence of the stopper 174 on the stopper removal arm 166, as described in greater detail with respect to FIG. 10A below. The filling arm 168 includes a mount 204 for receiving the tubing 136 and needle 206 (shown in FIG. 17) therein. The crimp arm 162 includes a plurality of radially moveable flanges 208 for crimping the cap 176 on the vial 101 after the vial 101 has been filled.

Figure 7:
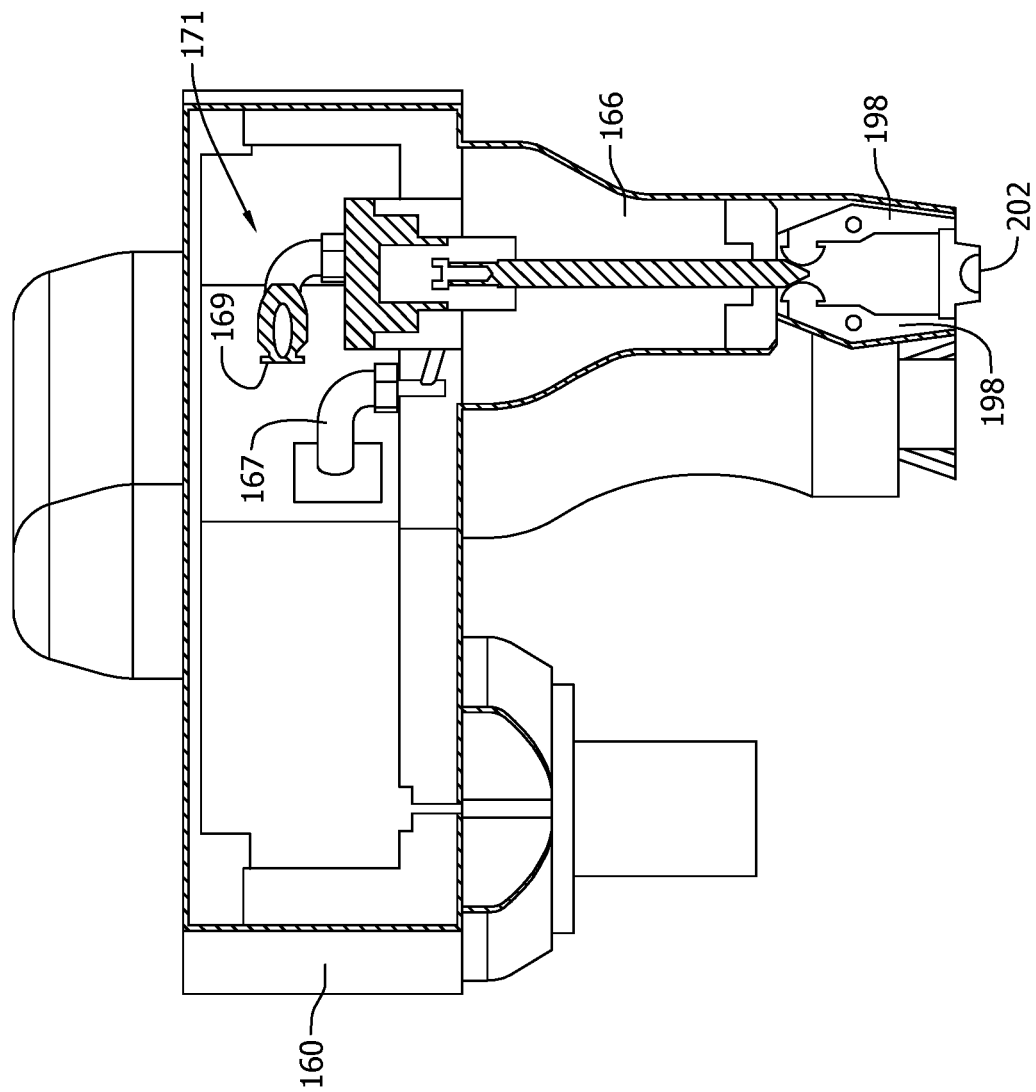
FIG. 7 is a sectional view of the head of the dispensing unit shown in FIG. 6.

The crimp arm 162, cap removal arm 164, and stopper removal arm 166 are each actuated pneumatically and are controlled independently of one another. In this example embodiment, separate pneumatic lines 410, 412, 414 (shown in FIG. 10A) are connected to each of the crimp arm 162, cap removal arm 164, and stopper removal arm 166. The pneumatic lines 410, 412, 414 include tubing that is fed through an interior of the carriage 160 and to the connector 152 (shown in FIG. 8) of the dispensing unit 130. Referring to FIG. 7, in this example, the carriage 160 includes two pneumatic connectors 167, 169 within an interior 171 of the carriage 160. The pneumatic connectors 167, 169 are each operably connected to the stopper removal arm 166 for controlling a vacuum of the stopper removal arm 166 at the suction port 202 and for controlling the grippers 198, respectively. Additionally, the crimp arm 162 and the cap removal arm 164 also include similar pneumatic connectors (not shown) within the interior 171 of the carriage 160 and operably connected thereto.

Figure 8:
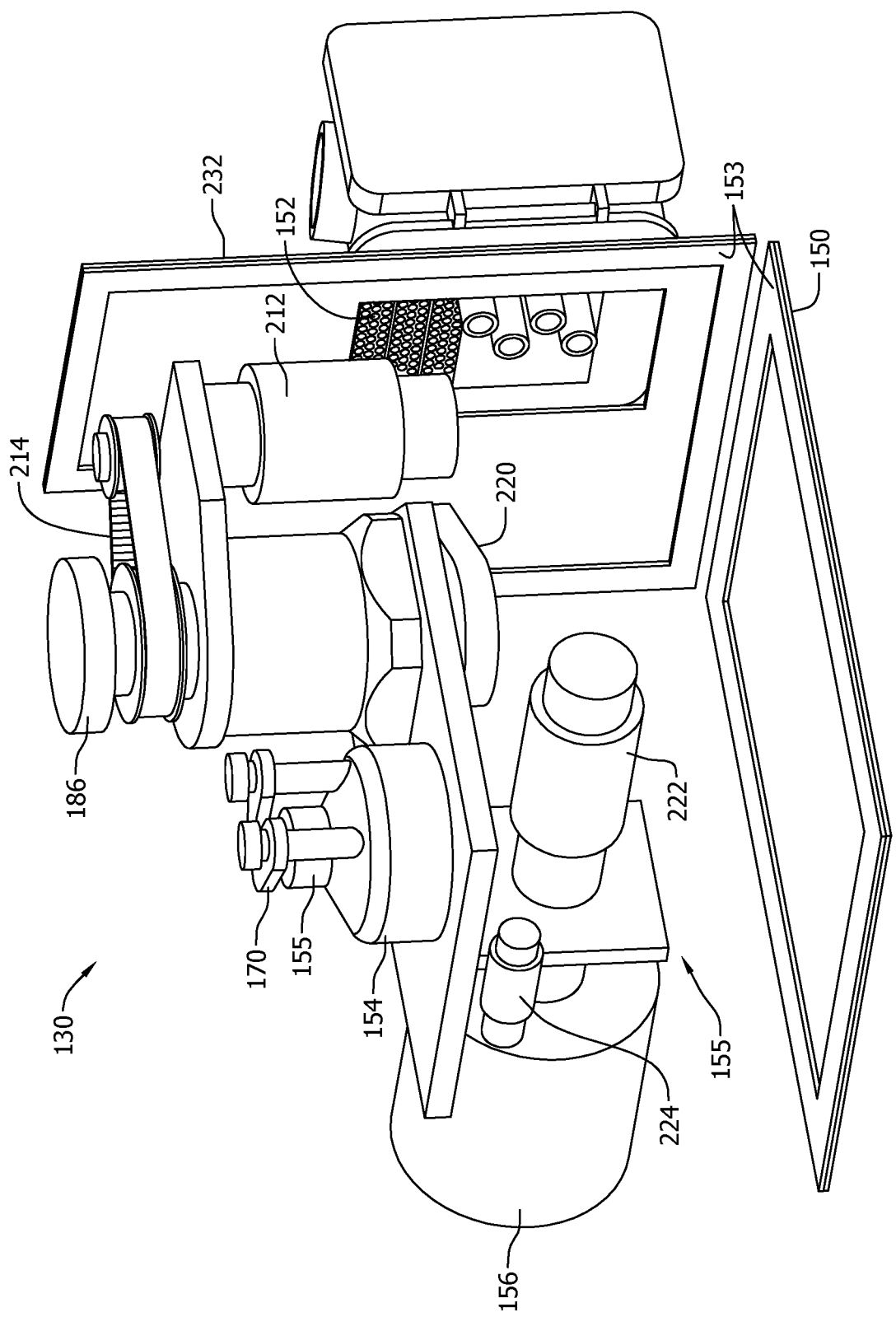
FIG. 8 is an enlarged perspective view of the dispensing unit shown in FIG. 5, with portions of a body of the dispensing unit removed to reveal internal construction.
Figure 9:
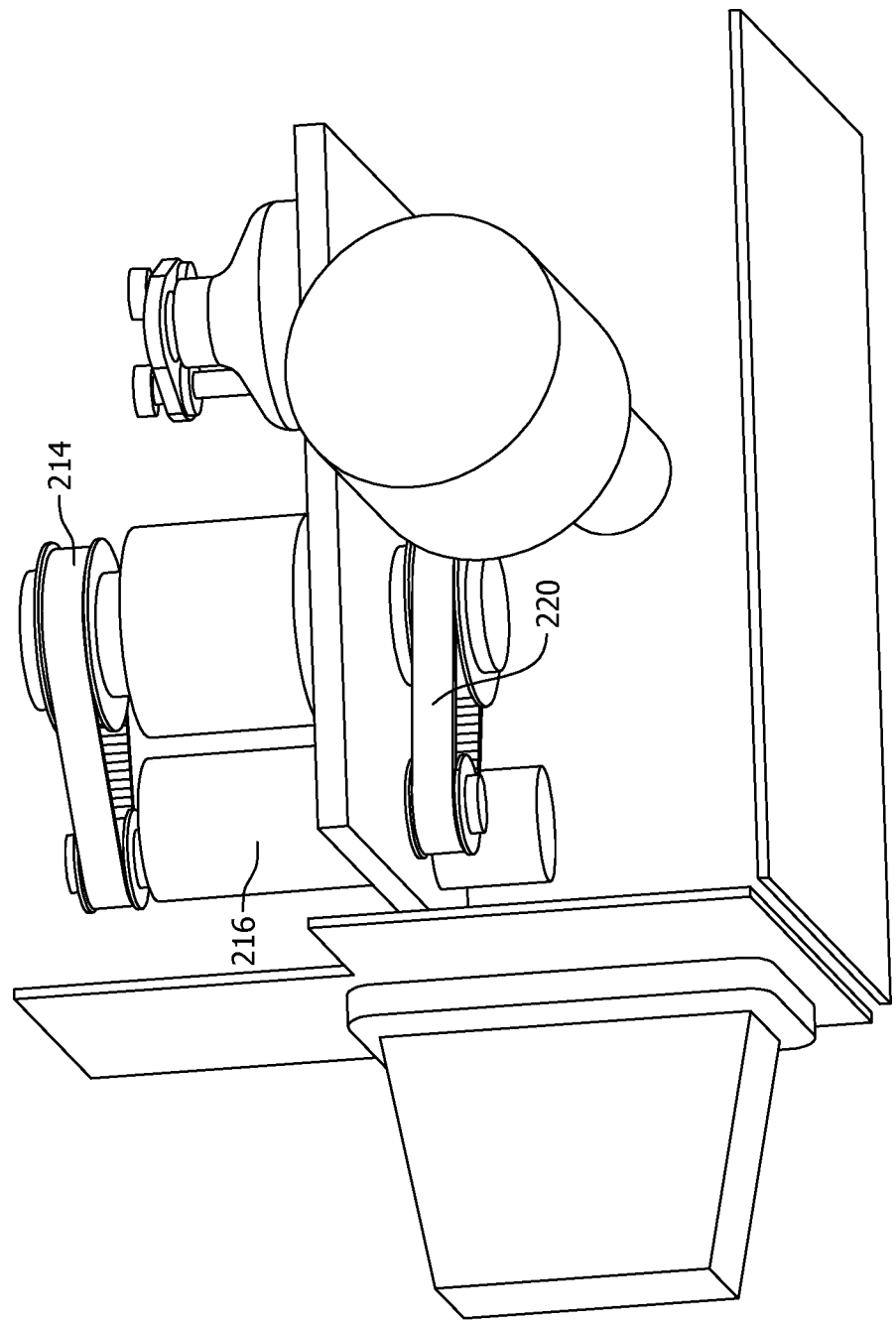
FIG. 9 is another perspective view of the dispensing unit shown in FIG. 8.

FIGS. 8 and 9 are enlarged perspective views of the dispensing unit 130, showing portions of the body 150 omitted to reveal internal components of the dispensing unit 130. The dispensing unit 130 includes four servomotors 212, 216, 222, 224 contained therein. A first servomotor 212 is operably connected to the neck 186 by a first drive belt 214 and a second servomotor 216 (shown in FIG. 9) is operably connected to the neck 186 by a second drive belt 220. Operation of the first servomotor 212 rotates the carriage 160 (shown in FIG. 5) relative to the body 150 and operation of the second servomotor 216 moves the carriage 160 longitudinally between the extended and retracted positions. The third servomotor 222 is operably connected to the pump 156 and is controllable to drive operation of the pump 156 to deliver the radioactive drug product to the vials 101. The fourth servomotor 224 is operably connected to a platform 155 of the pedestal 154 and adjusts a position of the platform 155 during filling, as described in greater detail below. The vial lock assembly 170 is pneumatically actuated. In other embodiments, any of the servomotors 212, 216, 222, 224 may instead be a pneumatically actuated drive mechanism and/or stepper motors.

The dispensing unit 130 further includes seals 153 extending along the walls of the dispensing unit 130. The seals 153 seal off an interior cavity 157 of the dispensing unit 130, facilitating a leak tight enclosure within the body 150 to keep any particulate within the interior cavity 157 from exiting into the hot cell environment and to prevent any outside contaminants, such as, vaporized hydrogen peroxide (VHP) used in grade A isolator pharmaceutical dispensing, from entering the dispensing unit 130.

Figure 10A:
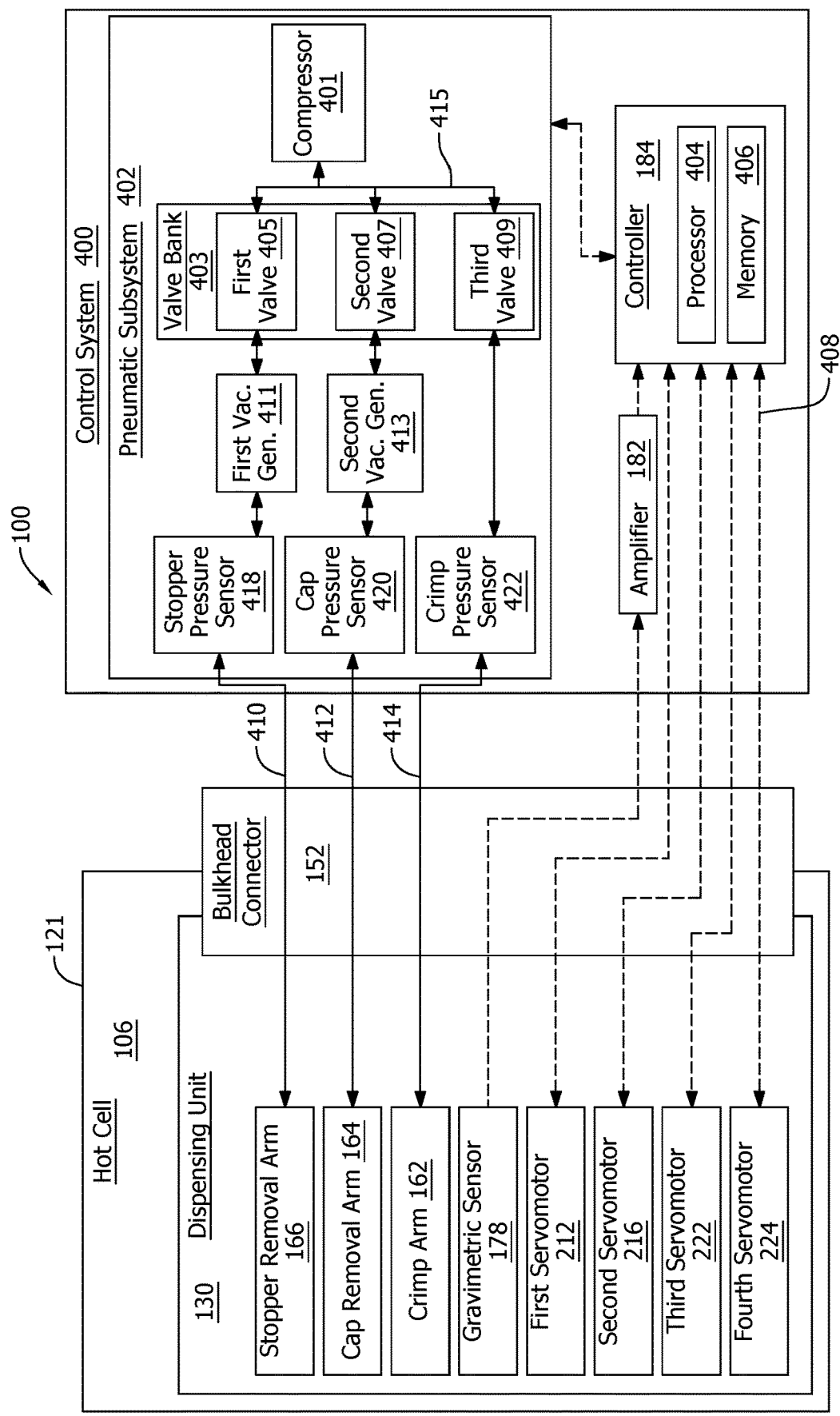
FIG. 10A is a control schematic diagram including the dispensing unit shown in FIG. 4 and a control system outside of the dispensing hot cell shown in FIG. 3.

FIG. 10A is a schematic of a portion of the production system 100 showing a control system 400 that is positioned outside of the hot cell 106 and controls operation of the dispensing unit 130. The control system 400 includes a pneumatic subsystem 402 and the controller 184. The controller 184 includes a processor 404 and a memory 406 having instructions thereon which, when executed by the processor 404 causes the processor 404 to perform certain functions detailed herein. As shown in FIG. 10A, each of the servomotors 212, 216, 222, 224 are connected to the external controller 184 by wiring 408 (shown in FIG. 10A as dashed lines) within the interior of the body 150 (shown in FIG. 8) and extending to the connector 152. Each servomotor 212, 216, 222, 224 has encoder feedback. In some embodiments, the system 100 further includes one or more servodrives (not shown), each of which is connected between a corresponding one of the servomotors 212, 216, 222, 224 and the controller 184 and positioned within the control system 400.

The connector 152 includes electrical and pneumatic pathways for the internal components of the dispensing unit 130 from the interior of the dispensing unit 130 to a position outside of the dispensing hot cell 106. For example, referring back to FIG. 3, the dispensing unit 130 is positioned within the dispensing hot cell 106 such that the connector 152 is positioned adjacent a back wall 230 of the shielding 121 and may at least partially extend through the shielding 121. As shown in FIG. 8, the dispensing unit 130 includes a back wall 232 that is positioned adjacent to the shielding back wall 230 (shown in FIG. 3) and the connector 152 extends outward from the back wall 232 of the dispensing unit 130. The connector 152 includes pathway for electrical wiring 408 and pneumatic lines 410, 412, 414 (shown in FIG. 10) to pass therethrough. The connector 152 is a single bulk connector that provides pneumatic connections, high voltage electrical connections for the servomotors 212, 216, 222, 224, and small signal cabling for the gravimetric sensor 178, as shown in FIG. 10A.

Referring back to FIG. 10A, the dispensing unit 130 includes a gravimetric sensor 178 provided in the pedestal 154 (shown in FIG. 4) for measuring a mass of the vial on the pedestal 154. In the example embodiment, the gravimetric sensor 178 is an electronic balance that includes crystal sensor including a mass sensitive load cell that is electrically connected to an amplifier 182 that is positioned outside of the dispensing hot cell 106. The load cell proportionally changes electrical resistance based on applied force on the pedestal 154, which is detected by the amplifier 182 and converted into mass measurements.

The controller 184 is communicatively coupled to the gravimetric sensor 178 and controls the dispensing unit 130 based on the detected mass, such as, for example, by verifying the amount of radioactive drug product dispensed into the vials 101. In particular, the controller 184 detects a change in mass, indicating that an empty vial 101 has been placed on the pedestal 154 (shown in FIG. 8) and records a first mass measurement of the empty vial 101. During dispensing operations, the controller 184 controls dispensing of a target volume of drug product into the vial 101, by transmitting control signals to third servomotor 222, and then verifies that the correct volume of drug product was dispensed based on a second mass measurement of the vial 101 after the target volume has been dispensed. If the second mass measurement (or a calculated difference between the first and second mass measurements) is below a predetermined threshold, the controller 184 then controls dispensing of additional volume of fluid and then rechecks the change in mass, repeating until the detected change in mass falls within acceptable tolerance limits. If the second mass measurement exceeds another predetermined threshold, the vial 101 is rejected and an alert may be triggered in response. In other embodiments, the controller 184 receives continuous mass feedback from the gravimetric sensor 178 while dispensing.

Additionally, the controller 184 is configured to automatically adjust dispensing operations for subsequent vials 101 based on the mass measurements of a previous filled vial or set of filled vials. For example, the controller 184 is further in communication with the pump 156 (shown in FIG. 4) and performs an automatic pump calibration correction by calculating a rolling average of a predetermined number of previously filled vials 101. The controller 184 automatically adjusts control of the pump 156 based on the calculated average to ensure dispensing of the target volume of solution. The automatic calibration allows for adjustments to pump control which may be necessitated by changes to the tubing 136, which may warm and stretch over general use, causing incrementally decreases in the dispense volume overtime if control of the pump 156 is uncorrected.

The controller 184 is electrically connected to the gravimetric sensor 178 and the first through fourth servomotors 212, 216, 222, 224 by electrical wiring 408, and, in some embodiments, one or more servodrives (not shown). The controller 184 is also in communication with the pneumatic subsystem 402.

The pneumatic subsystem 402 includes a compressor 401 and a valve bank 403. The valve bank 403 includes a first valve 405, a second valve 407, and a third valve 409. The pneumatic subsystem 402 further includes a first vacuum generator 411, a second vacuum generator 413, a stopper pressure sensor 418, a cap pressure sensor 420, and a crimp pressure sensor 422. Each of the respective pneumatic lines 410, 412, and 414 extend through the pneumatic subsystem 402 and are in flow communication with the compressor 401 by the valve bank 403.

The compressor 401 intakes ambient air from outside of the hot cell 106 and exhausts a compressed air flow into a compressed air line 415. The compressed air line 415 extends between the compressor 401 and the valve bank 403 and is branched to direct the compressed airflow to each of the valves 405, 407, 409. In the example embodiment each of the valves 405, 407, 409 are solenoid valves and are configured to be transitioned between an open state, a closed state, and a plurality of states between the open and closed states. In some embodiments, the valves 405, 407, 409 are not grouped in the valve bank 403 and instead are individually connected to one of the respective pneumatic lines 410, 412, and 414.

The first vacuum generator 411 is connected to the first pneumatic line 410 between the first valve 405 and the stopper pressure sensor 418. The second vacuum generator 413 is connected to the second pneumatic line 412 between the second valve 407 and the cap pressure senor 420. The vacuum generators 411, 413 are each configured to receive the compressed air and generate a vacuum or negative air pressure in the corresponding line 410, 412. The vacuum generators 411, 413 are each a venturi vacuum generator, though other suitable vacuum generators may be used. The third pneumatic line 414 does not include a vacuum generator, as the compressed air in the third line 414 is used to actuate the crimp arm 162. The pressure sensors 418, 420, 422 are each coupled to a respective one of the lines 410, 412, and 414 and are configured to detect air pressure level within the respective lines. The stopper pressure sensor 418 and the cap pressure sensor 420 are each vacuum pressure sensors or negative pressure sensors, terms used interchangeably herein.

In the example of FIG. 10A, the bulkhead connector 152 extends through the radiation shielding 121 of the dispensing hot cell 106 to allow pneumatic lines 410, 412, 414 to pass from the stopper removal arm 166, the cap removal arm 164, and the crimp arm 162, out of the dispensing unit 130 and the hot cell 106 and to the pneumatic subsystem 402. Although the bulkhead connector 152 is illustrated as a single connector, in other embodiments, the dispensing unit 130 may include multiple connectors provided at different regions of the dispensing unit 130 that collectively provide a path for the pneumatic lines 410, 412, 414 and electrical wiring 408 from inside of the dispensing unit 130 and to the pneumatic subsystem 402 and the controller 184, respectively. For example, in other embodiments the dispensing unit 130 may include a first connector for the electrical wiring 408 and a separate, second connector (not shown) for the pneumatic lines 410, 412, 414.

The controller 184 is operable to control dispensing operations by controlling the pneumatic subsystem 402 and the servomotors 212, 216, 222, 224. For example, the controller 184 provides electrical control signals to the first servomotor 212 to control rotation of the carriage 160 (shown in FIG. 6), to the second servomotor 216 to control the vertical position of the carriage 160, to the third servomotor 222 to control operation of the pump 156 for dispensing operations, and to the fourth servomotor 224 to control a vertical position of the vial 101 on the pedestal 154. The controller 184 also controls operation of the respective arms 162-168 by controlling the pneumatic subsystem 402. For example, the controller 184 controls the compressor 401 and/or an actuation state of one of more of the valves 405, 407, 409 to perform operations such as, actuating the grippers 198 of the stopper removal arm 166, providing a vacuum to the suction port 202 of the stopper removal arm 166, providing a vacuum to the suction cup 196 of the cap removal arm 164, and actuating the flanges 208 of the crimp arm 162.

The controller 184 is further in communication with each of the pressure sensors 418, 420, 422 coupled to the respective pneumatic lines 410, 412, 414 and controls operation of the dispensing unit 130 based on signals received from each of the pressure sensors 418, 420, 422. During undressing operations, the controller 184 determines whether the stopper 174 of the vial 101 has been engaged by the suction port 202 of the stopper removal arm 166 based on the air pressure in the first pneumatic line 410, as detected by the stopper pressure sensor 418, falling within a predetermined range. Likewise, the controller 184 determines whether the cap 176 is engaged by the suction cup 196 based on the air pressure in the second pneumatic line 412, as detected by the cap pressure sensor 420. The controller 184 is further able to verify a crimping force applied by the flanges 208 on the cap 176 of the vial 101 during redressing based on the air pressure detected in the third pneumatic line 416. The sensors 418, 420, and 422 are operable to detect dropped parts and properly reapplied parts and are monitored continuously by the controller 184.

Figure 14:
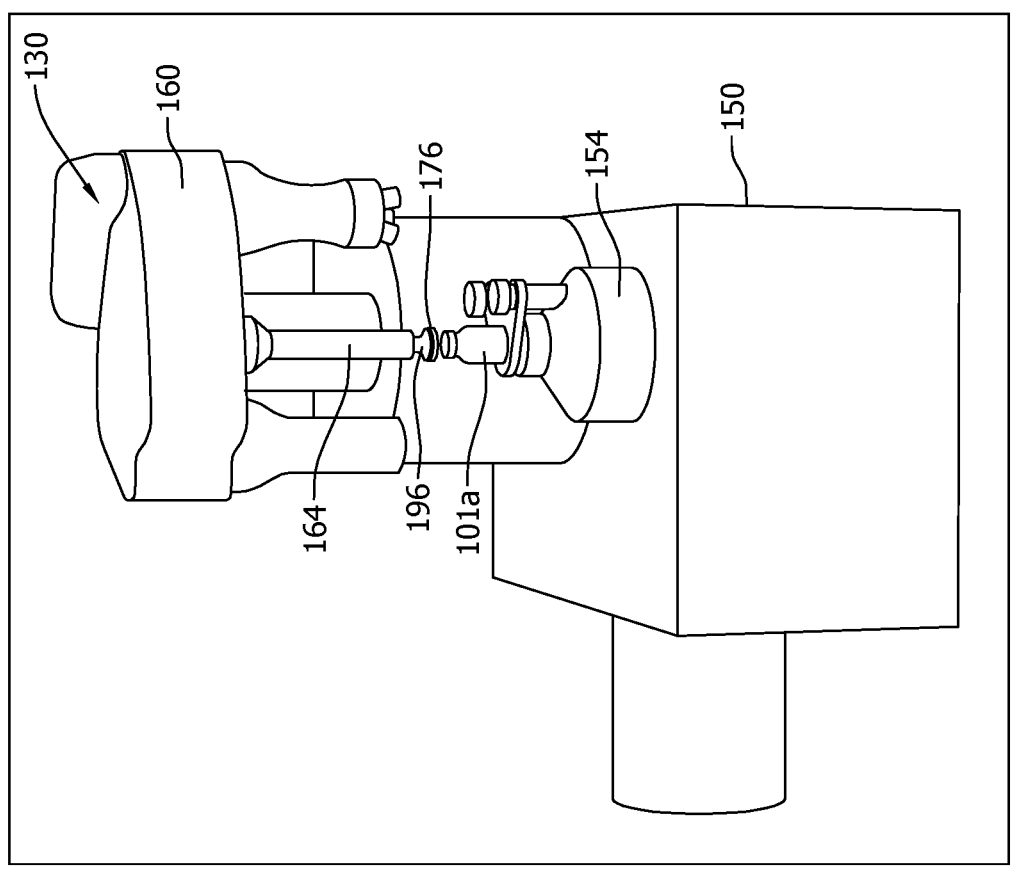
FIG. 14 is a perspective view of the dispensing unit shown in FIG. 4 shown during a second step of the undressing process shown in FIG. 10.

For example, during undressing operations, when the cap 176 is engaged by the suction cup 196 of the cap removal arm 164, as shown in FIG. 14, the cap 176 at least partially obstructs airflow through the suction cup 196, thereby changing the air pressure in the second pneumatic line 412. The cap pressure sensor 420 detects the change in air pressure and transmits the detected pressure in the second pneumatic line 412 to the controller 184. The controller 184 then checks whether the detected pressure is within a predetermined range, indicating that the cap 176 is engaged by the suction cup 196 and may be lifted off the vial 101. If the detected pressure falls within the predetermined range, the controller 184 controls the dispensing unit 130 to proceed to a next step of the dispensing process. If the detected pressure is outside of the predetermined range, indicating that the cap 176 was not properly engaged by the suction cup 196 of the cap removal arm 164, the controller 184 halts dispensing operations, triggers an alarm indicating a fault has occurred, and/or automatically retries the cap removal operation.

Likewise, when the stopper 174 is engaged by the grippers 198, the suction port 202 of the stopper removal arm 166 is at least partially blocked by the stopper 174, thereby changing the air pressure in the first pneumatic line 410. The stopper pressure sensor 418 detects the change in pressure and transmits the detected pressure to the controller 184, which checks that the pressure is within a predetermined range indicating that the stopper 174 is engaged by the grippers 198 and may be lifted off the vial 101. If the detected pressure falls within the predetermined range, the controller 184 controls the dispensing unit 130 to proceed to a next step of the dispensing process. If the detected pressure is outside of the predetermined range, indicating that the stopper 174 was not properly engaged by the grippers 198 of the stopper removal arm 166, the controller 184 halts dispensing operations and/or triggers an alarm indicating a fault has occurred. Additionally, if the cap 176 or the stopper 174 are dropped from the respective arms 162-168 prior to their release during redressing, the controller 184 halts dispensing operations, triggers an alarm indicating a fault has occurred, and/or automatically retries the stopper removal operation.

Referring to FIG. 10A, the bulkhead connector 152 provides for the transmission of the pneumatic lines 410, 412, 414, and the electrical wiring 408, from inside of the dispensing unit 130 to the control system 400 outside of the hot cell 106. As a result, radiation sensitive components, such as the processor 404 and memory 406 of the controller 184, each of the pressure sensors 418, 420, 422, proximity sensors (not shown), valve bank 403, compressor 401, or general electronics, may be positioned outside of the dispensing hot cell 106 to prevent damage while still allowing for automated control and monitoring of the dispensing unit 130. For example, each of the sensors 418, 420, 422 are connected to the respective pneumatic lines 410, 412, 414 at a position outside of the dispensing hot cell 106. The respective vacuums are generated from the vacuum generators 411, 413 outside the hot cell 106. Based on the monitored vacuum levels, the controller 184 may determine whether, for example, the cap removal arm 164 has picked up the cap 176, and/or the stopper removal arm 166 has picked up the stopper 174. Additionally, the crimp arm 162 is actuated pneumatically via compressed air, the pressure levels of which are monitored from outside the hot cell to determine whether the crimp arm 162 has crimped the cap 176.

Additionally, the pneumatic subsystem 402 and controller 184 being positioned outside of the hot cell 106 improves ease of access to components of the subsystem 402 or controller 184. Components of the pneumatic subsystem 402 and controller 184 may be easily accessed and repaired or serviced outside of the hot cell 106 without needing to enter the pharmaceutically decontaminated high radiation environment. For example, sensor or valve failures can be fixed, vacuum generators 411, 413 can be replaced, and external leaks in the pneumatic lines 410, 412, and 414 may be repaired without affecting a production batch inside of the hot cell 106.

The only sensors within the dispensing unit 130 of this embodiment are the gravimetric sensor 178 and the corresponding sensors of the servomotors 212, 216, 222, 224. In this embodiment, the servomotors 212, 216, 222, 224 each use an encoder, though in other embodiments the servomotors 212, 216, 222, 224 may alternatively use a resolver for additional radiation protection.

Figure 10B:
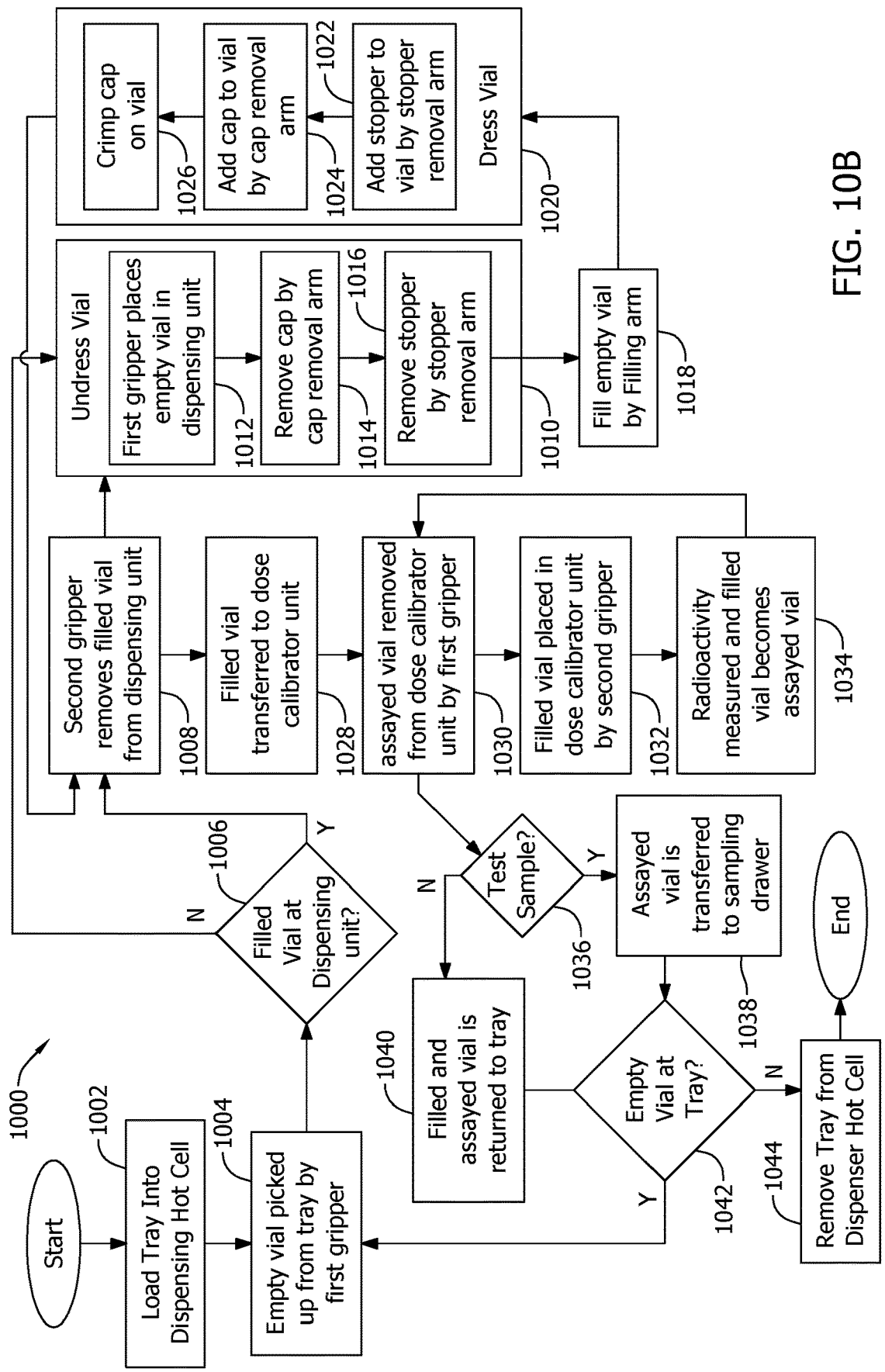
FIG. 10B is a flow diagram depicting a process of filling vials with a radioactive drug product using the production system of FIG. 1.

FIG. 10B is a flow diagram depicting a process 1000 of filling the vials 101 within the dispensing hot cell 106. FIGS. 11-24 depict steps of the process.

Figure 11:
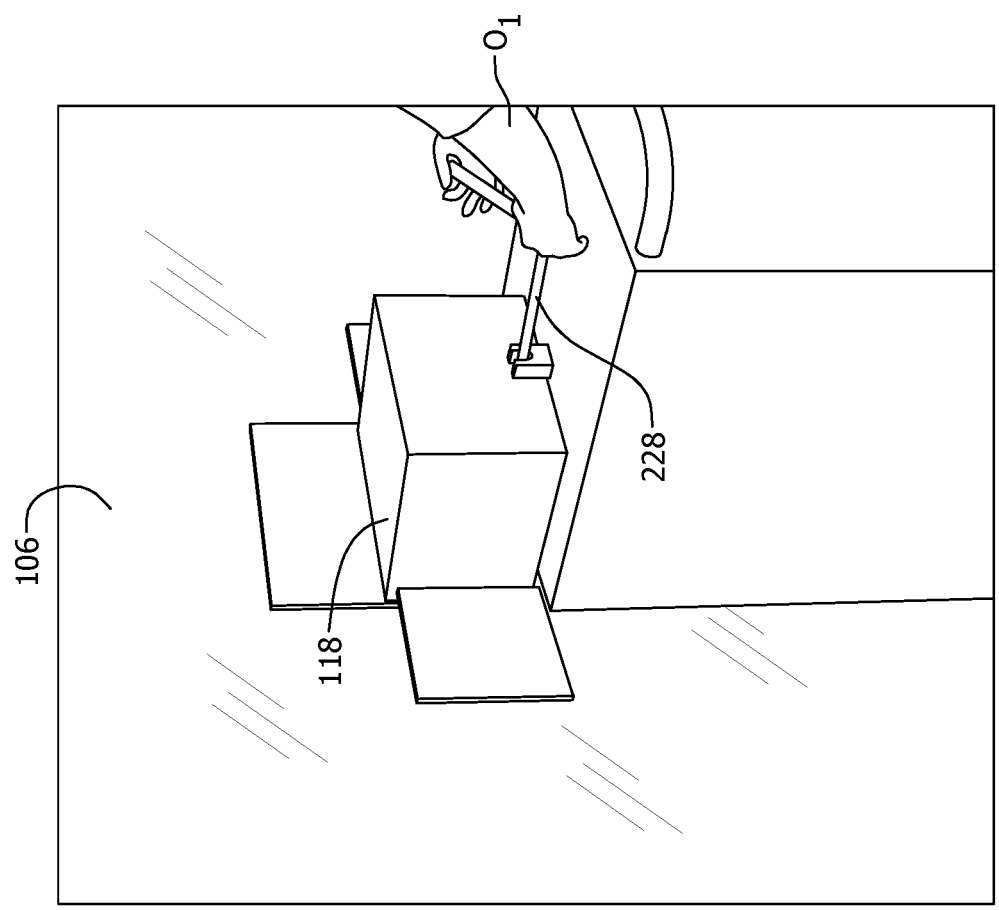
FIG. 11 is a perspective view of a shielded cart and the dispensing hot cell shown in FIG. 3.
Figure 12:
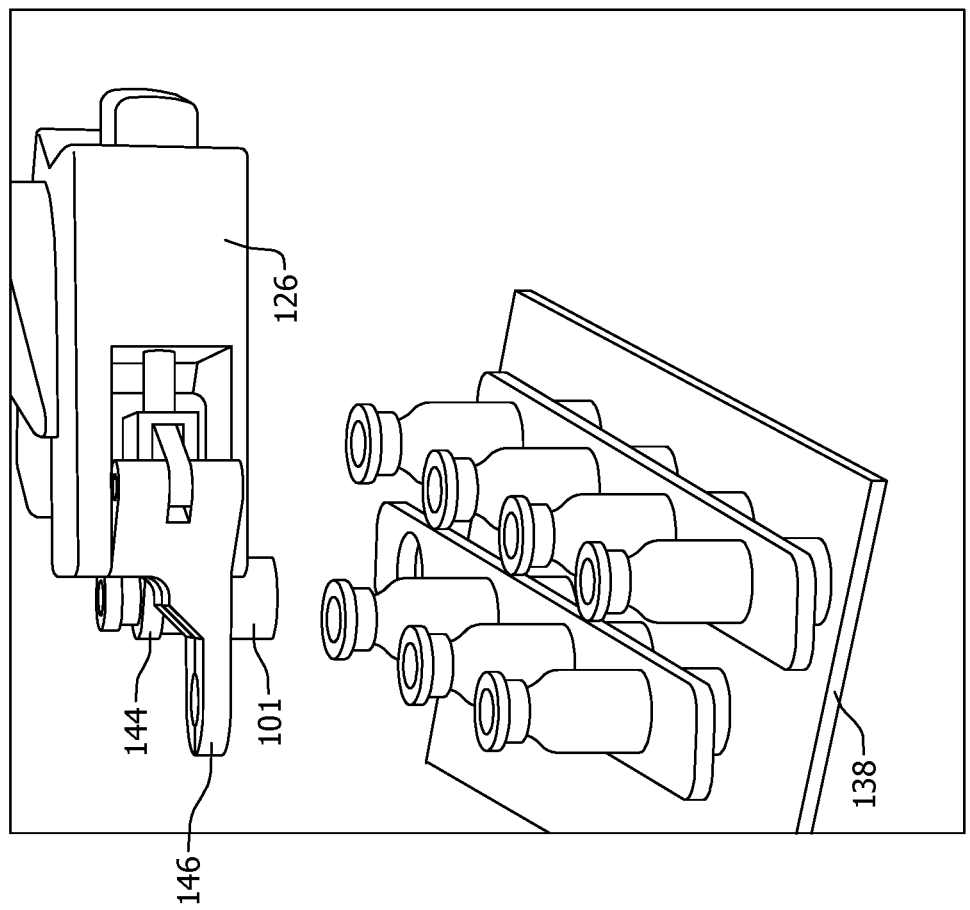
FIG. 12 is a perspective view of a tray loaded within the dispensing hot cell shown in FIG. 3.

At a first step 1002, the tray 138 of empty vials 101 is loaded into the dispensing hot cell 106. As shown in FIGS. 11 and 12, the tray 138 is loaded by an operator $O_1$ using a lever 228 to move a shuttle (not shown) provided within the cart 118 and carrying the tray 138 into the dispensing hot cell 106. In other embodiments, operators may load the trays 138 into the dispensing hot cell 106 through the access door (shown in FIG. 1). Referring to FIG. 12, once loaded into the hot cell, the tray 138 is positioned on a platform 141 above the table 128. Each of the vials 101 will be loaded into the dispensing cell 106 in an empty state (i.e., without any of the radioactive drug or other substances filling the vials 101).

Figure 13:
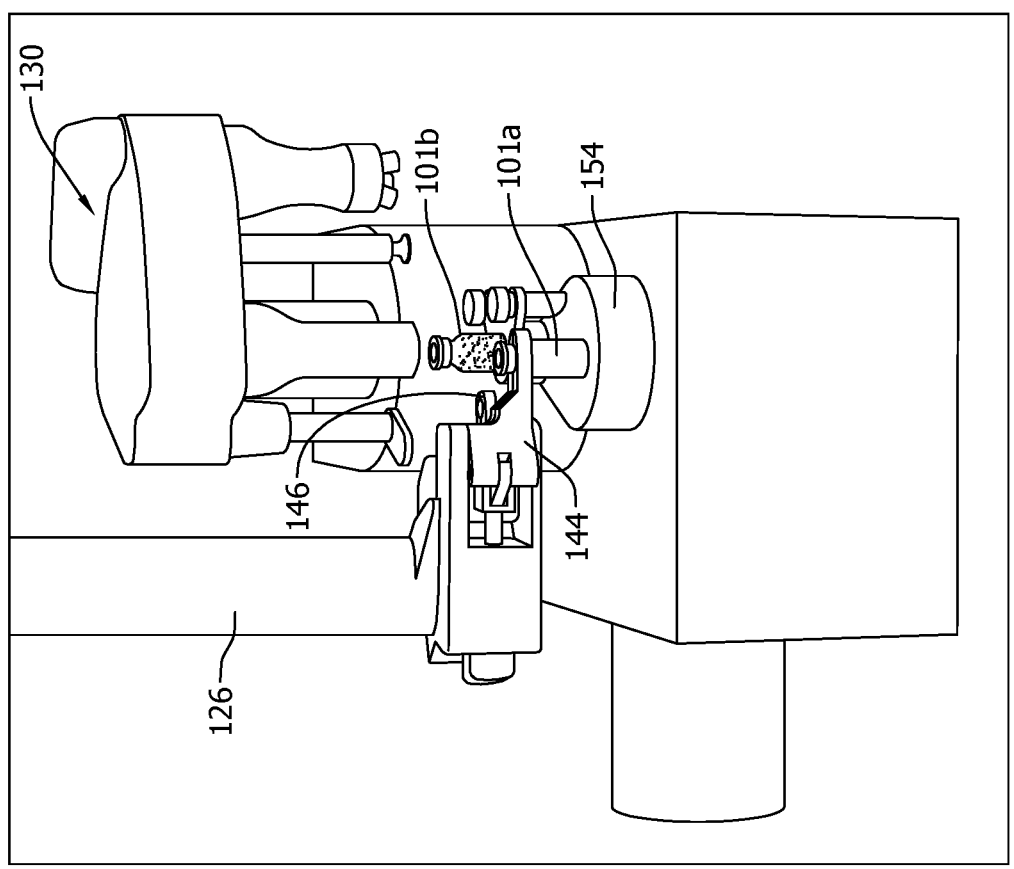
FIG. 13 is a perspective view of the dispensing unit shown in FIG. 4 shown during a first step of an undressing process shown in FIG. 10.

At a next step 1004, an empty vial 101a is picked up from the tray 138 by the robotic arm 126, as shown in FIG. 12. The robotic arm 126 includes two selectively controllable vial grippers 144, 146, though in other embodiments the arm may include any suitable number of vial 101 grippers. The empty vial 101a is picked up by the first vial 101 gripper 144 and carried by the robotic arm 126 (or a telemanipulator in other embodiments) to the dispensing unit 130, as shown in FIG. 13.

At a next step 1006, it is determined whether there is a filled vial 101b at the dispensing unit 130. The determination is made based on the gravimetric sensor 178 (shown in FIG. 10) sensing the mass of a filled vial 101b at the pedestal 154. If there is a filled vial 101b at the dispensing station, as shown in FIG. 13, process 1000 proceeds to step 1008 and the second vial 101 gripper 146 picks up the filled vial 101b, the first vial 101 gripper 144 deposits the empty vial 101a on the pedestal 154, and the vial lock assembly 170 closes to hold the empty vial 101a on the pedestal 154 for undressing. If there is not a filled vial 101b on the pedestal 154 (e.g., if the empty vial 101a is the first vial 101 in the batch to be filled) the process 1000 proceeds to step 1010.

Figure 15:
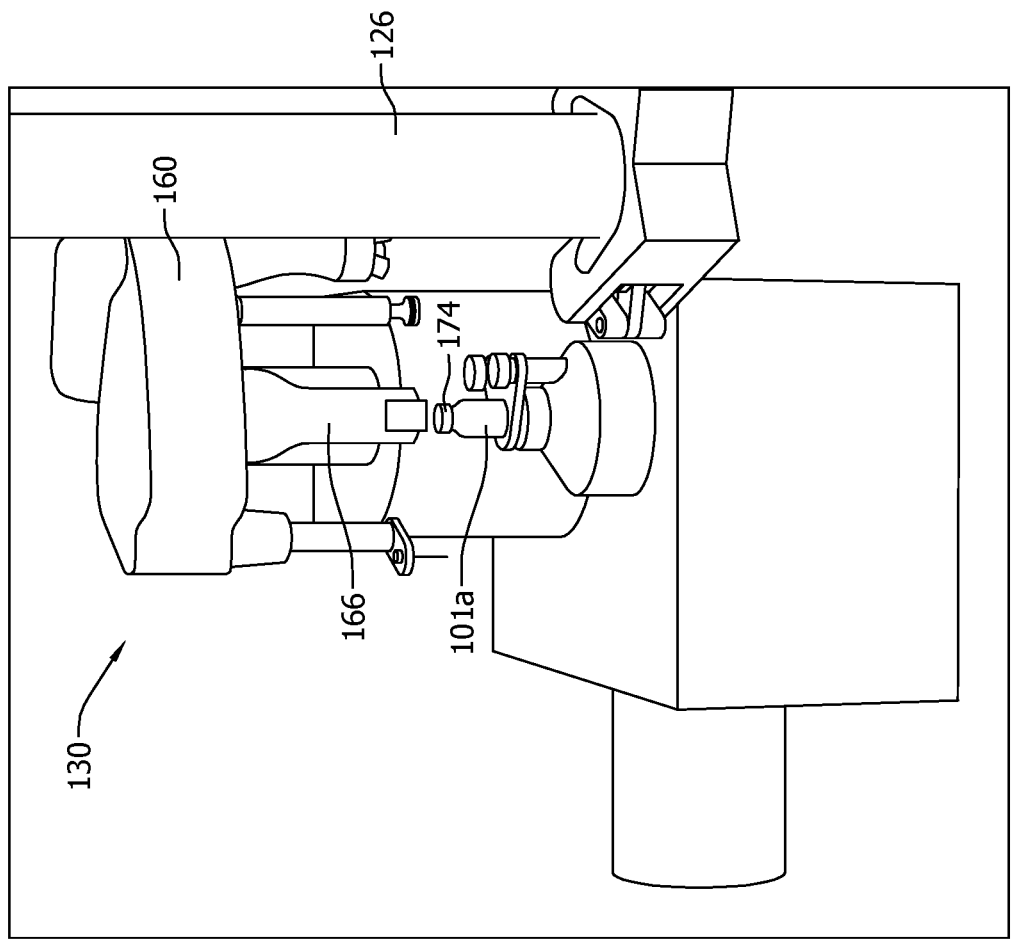
FIG. 15 is a perspective view of the dispensing unit shown in FIG. 4 shown during a third step of the undressing process shown in FIG. 10.

At step 1010, the dispensing unit 130 undresses the empty vial 101*a*. In a first step 1012 of the undressing processes 1010, the first gripper 144 deposits the empty vial 101*a* on the pedestal. In a second step 1014, the cap 176 is removed off the vial 101*a* by the cap removal arm 164. In the second step 1014, the carriage 160 of the dispensing unit 130 is lowered into the retracted position toward the pedestal 154 and the suction cup 196 engages the cap 176 of the vial 101*a*, as shown in FIG. 14. As shown in FIG. 15, the carriage 160 is then raised into the extended position, the cap 176 is carried off of the vial 101*a*, and the carriage 160 is rotated about the longitudinal axis $L_1$ (shown in FIG. 5) such that the stopper removal arm 166 is rotationally aligned with the empty vial 101*a*. The undressing process 1010 proceeds to a third step 1016 in which the stopper 174 is removed from the vial 101 by the stopper removal arm 166. In the step 1016, the carriage 160 is again lowered into the retracted position and the grippers 198 of the stopper removal arm 166 engage the stopper 174 on the empty vial 101*a*. The stopper 174 also at least partially obstructs the suction port 202 (shown in FIG. 7) of the stopper removal arm 166. The carriage 160 is then moved to the extended position, carrying the stopper 174 off of the empty vial 101*a*.

Figure 16:
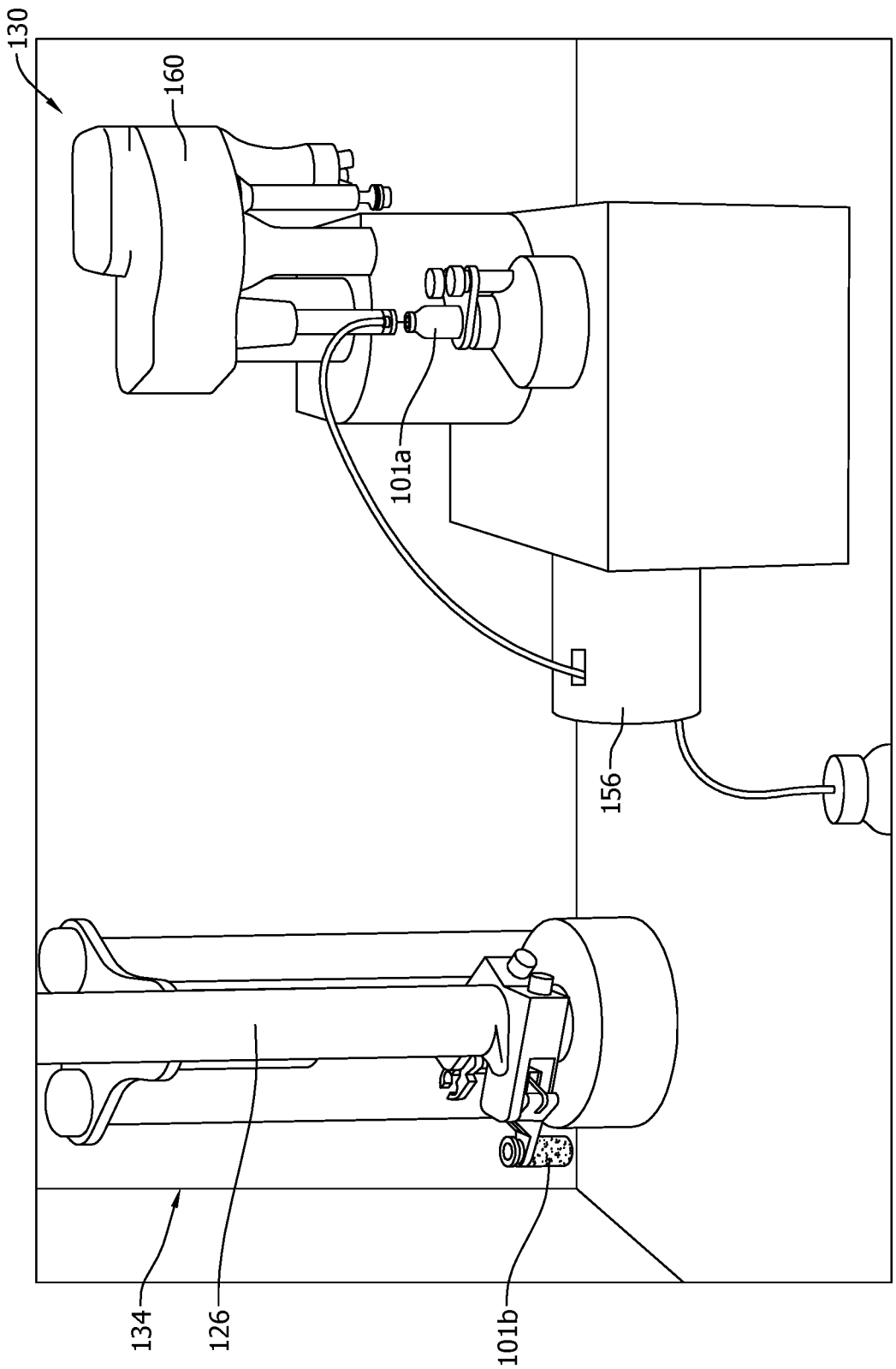
FIG. 16 is a perspective view of the dispensing unit shown in FIG. 4 shown during a filling step of the process shown in FIG. 10.
Figure 17:
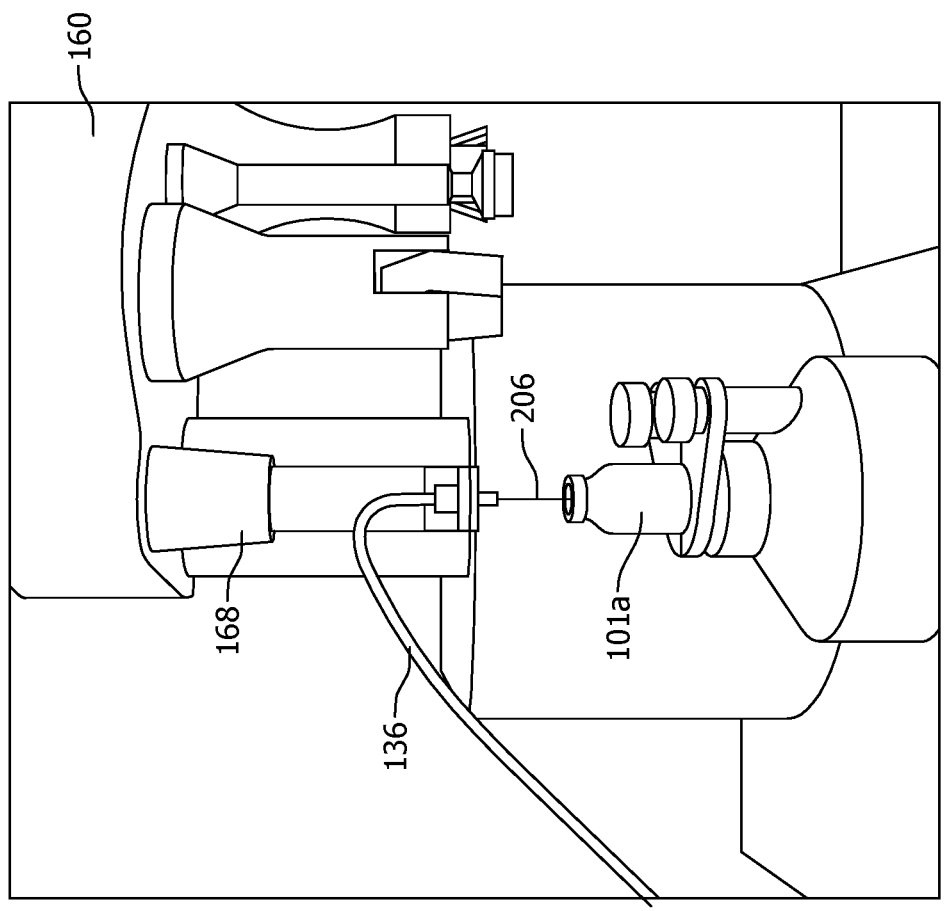
FIG. 17 is an enlarged view of the dispensing unit shown in FIG. 16.
Figure 18:
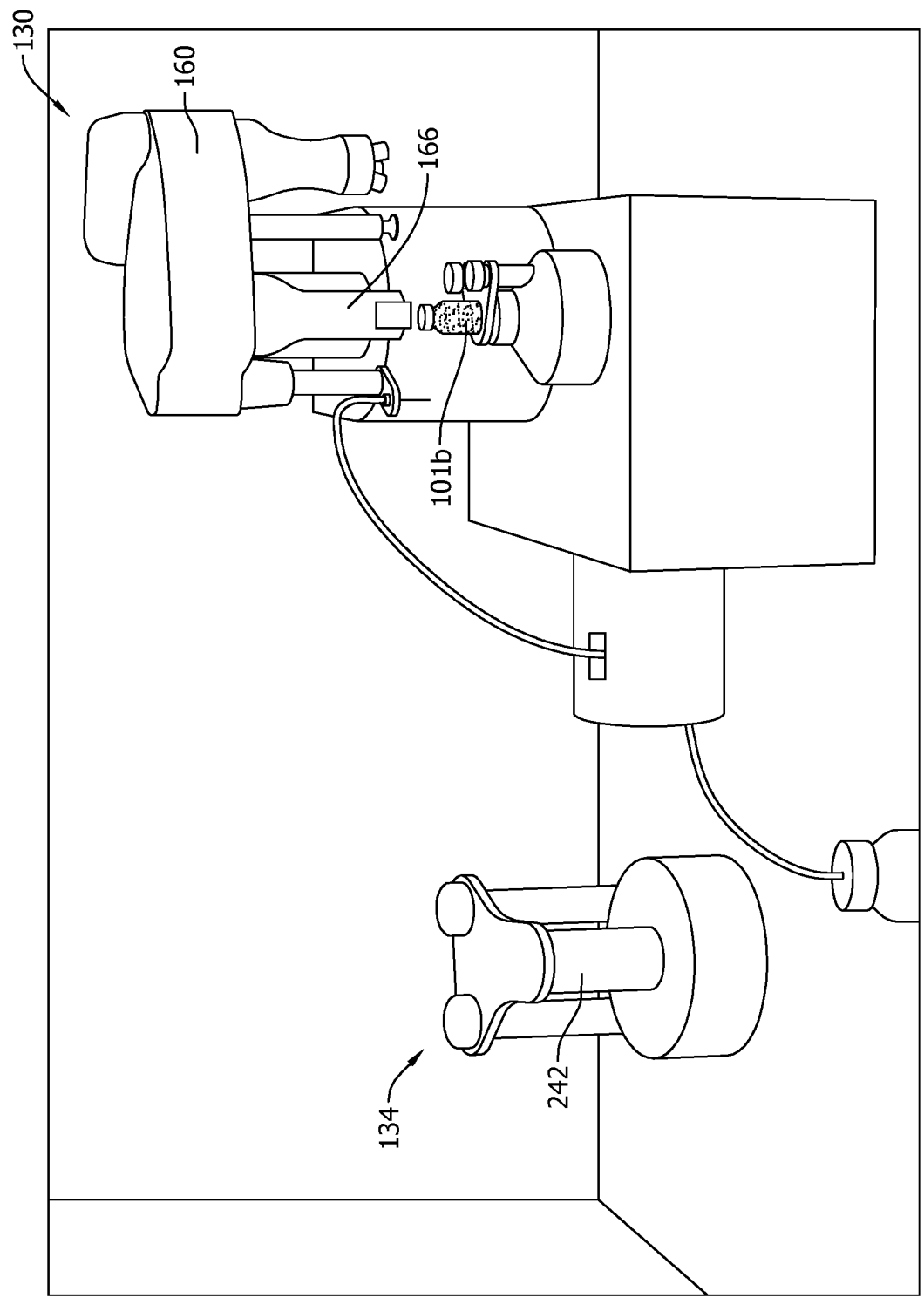
FIG. 18 is a perspective view of the dispensing unit shown in FIG. 4 shown during a first step of a dressing process shown in FIG. 10.

Referring back to FIG. 10B, after the vial 101 is undressed, process 1000 proceeds to step 1018, during which the empty vial 101*a* is filled on the dispenser. Referring to FIG. 16, during the filling step 1018, the carriage 160 is rotated such that the filling arm 168 is positioned in rotational alignment with the empty vial 101*a* and is then lowered to the retracted position, as shown in FIG. 16. As shown in FIG. 17, when retracted, the needle 206 is positioned inside of the empty vial 101*a*. The pump 156 (shown in FIG. 16) is then controlled, by the controller 184 sending control signals to the third servomotor 222, to dispense a metered volume of the radioactive drug product peristaltically through the needle 206 and into the vial 101.

The controller 184 controls dispensing of the drug product based on mass measurements received from the gravimetric sensor. During and/or after the filling step 1018, the filled vial 101*b* is weighed by the gravimetric sensor. If the dispensed mass falls below a lower acceptance limit (such as, for example, due to the presence of air bubbles within the tubing 136), additional drug product is dispensed and the vial 101 is again weighed. If too much drug product was dispensed (for example, due to incorrect calibration factors that equate pump 156 rotation to an amount of dispensed volume), the vial 101 will be rejected. In other embodiments, control of the pump 156 and/or third servomotor 222 is regulated based on continuous feedback from the gravimetric sensor 178 such that, when a detected mass of the vial 101 is within an acceptable range, dispensing stops. Simultaneously with the dispensing, the carriage 160 is slowly raised such that the needle 206 always remains within the interior confines of the vial 101 during dispensing.

Referring back to FIG. 10B, after the vial 101 is filled, the process 1000 proceeds to step 1020 at which the vial 101 is redressed in substantially the opposite manner as the undressing process 1010. For example, at step 1022 the stopper 174 is added to the vial 101 by rotating the carriage 160 to move the stopper removal arm 166 into rotational alignment with the vial 101. The carriage 160 is then lowered to fit the stopper 174 back onto the now filled vial 101*b*, and the vacuum is vented from the stopper removal arm 166 to release the stopper 174.

Figure 19:
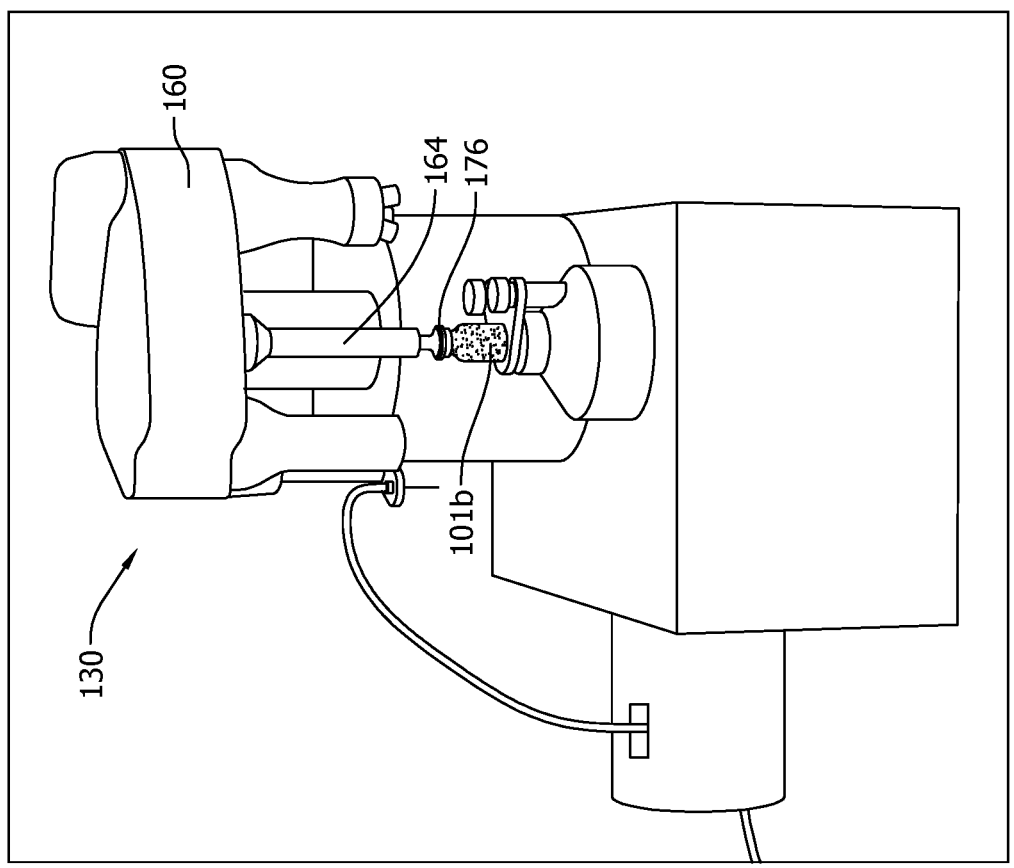
FIG. 19 is a perspective view of the dispensing unit shown in FIG. 4 shown during a second step of the dressing process shown in FIG. 10.

At step 1024, the cap is added to the vial 101 by the cap removal arm 164. The carriage 160 is raised and rotated to move the cap removal arm 164 into rotational alignment with the vial 101. The carriage 160 is then lowered to fit the cap 176 onto the filled vial 101*b*, as shown in FIG. 19, and vacuum is vented at the suction cup 196 to release the cap 176.

Figure 20:
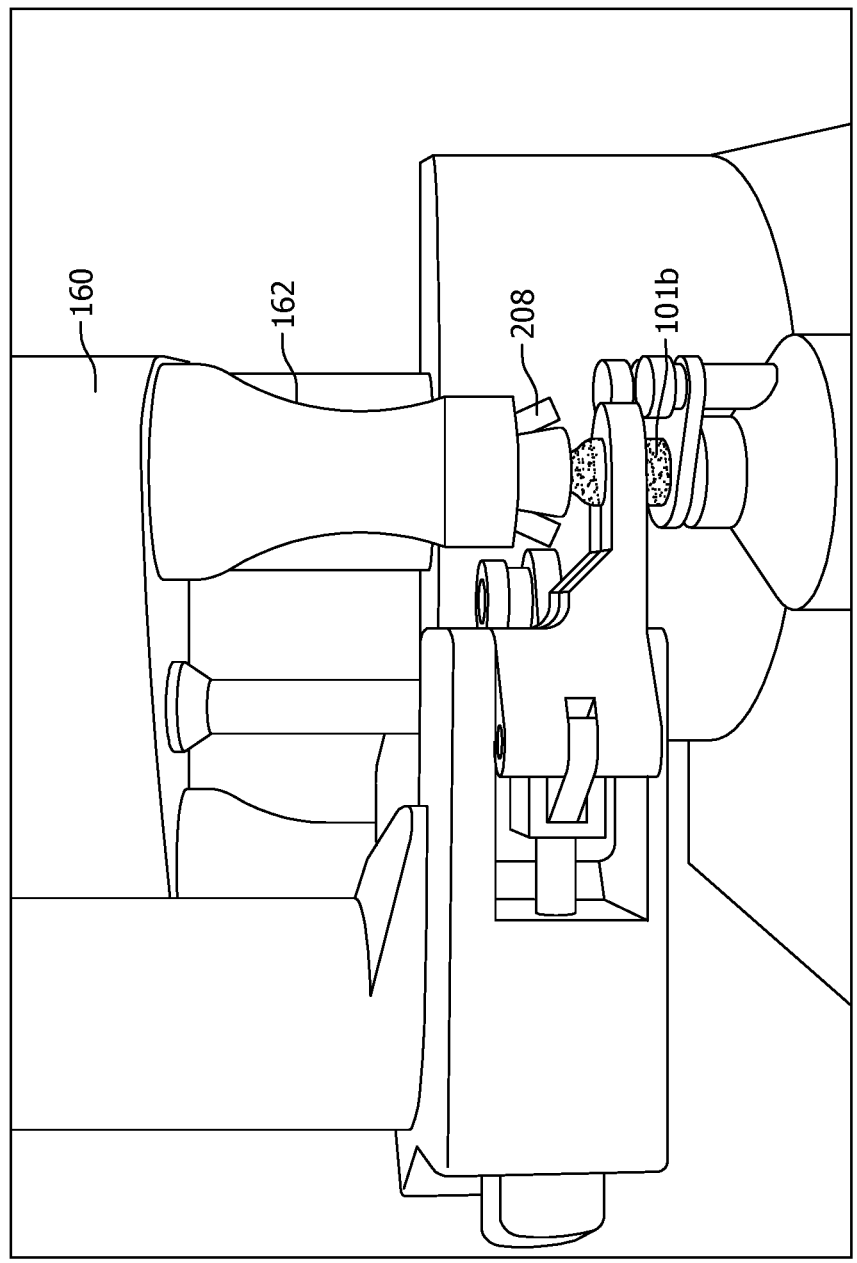
FIG. 20 is a perspective view of the dispensing unit shown in FIG. 4 shown during a third step of the dressing process shown in FIG. 10 and showing flanges of a crimp arm in an open state.
Figure 21:
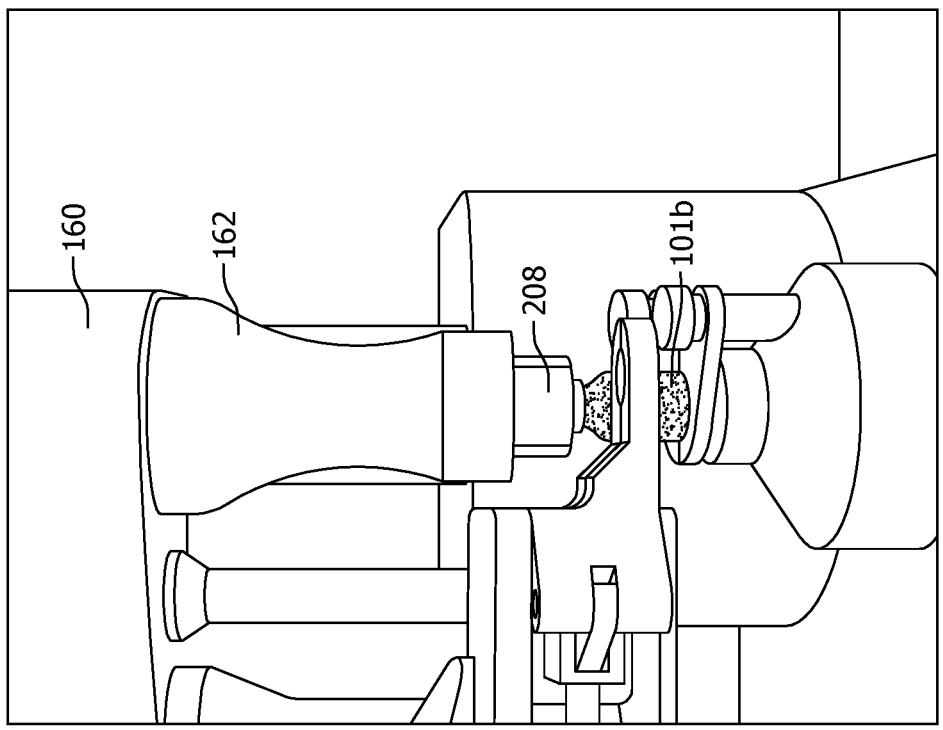
FIG. 21 is a perspective view of the dispensing unit shown in FIG. 4 shown during the third step of the dressing process shown in FIG. 10 and showing the flanges of the crimp arm in the closed state.

At step 1026, the cap 176 is crimped on the vial 101 by the crimp arm 162. As shown in FIG. 20, with the cap 176 fitted on the vial 101, the carriage 160 is again rotated to position the crimp arm 162 in rotational alignment with the filled vial 101*b*. The carriage 160 is then lowered with the flanges 208 of the crimp arm 162 in an open state, in which the flanges 208 project radially outward from one another. The carriage 160 is lowered such that downward pressure is applied to the cap 176, while the flanges 208 surround the cap 176. As shown in FIG. 21, the flanges 208 are then closed and released, thereby crimping the cap 176 on the filled vial 101*b*.

If the vial 101 is rejected it is still redressed in the same manner as a non-rejected vial 101, with the difference being that it is instead directed to a reject container (not shown) within the hot cell after dressing, rather than back into the rack, or into the sample drawer 120.

Figure 22:
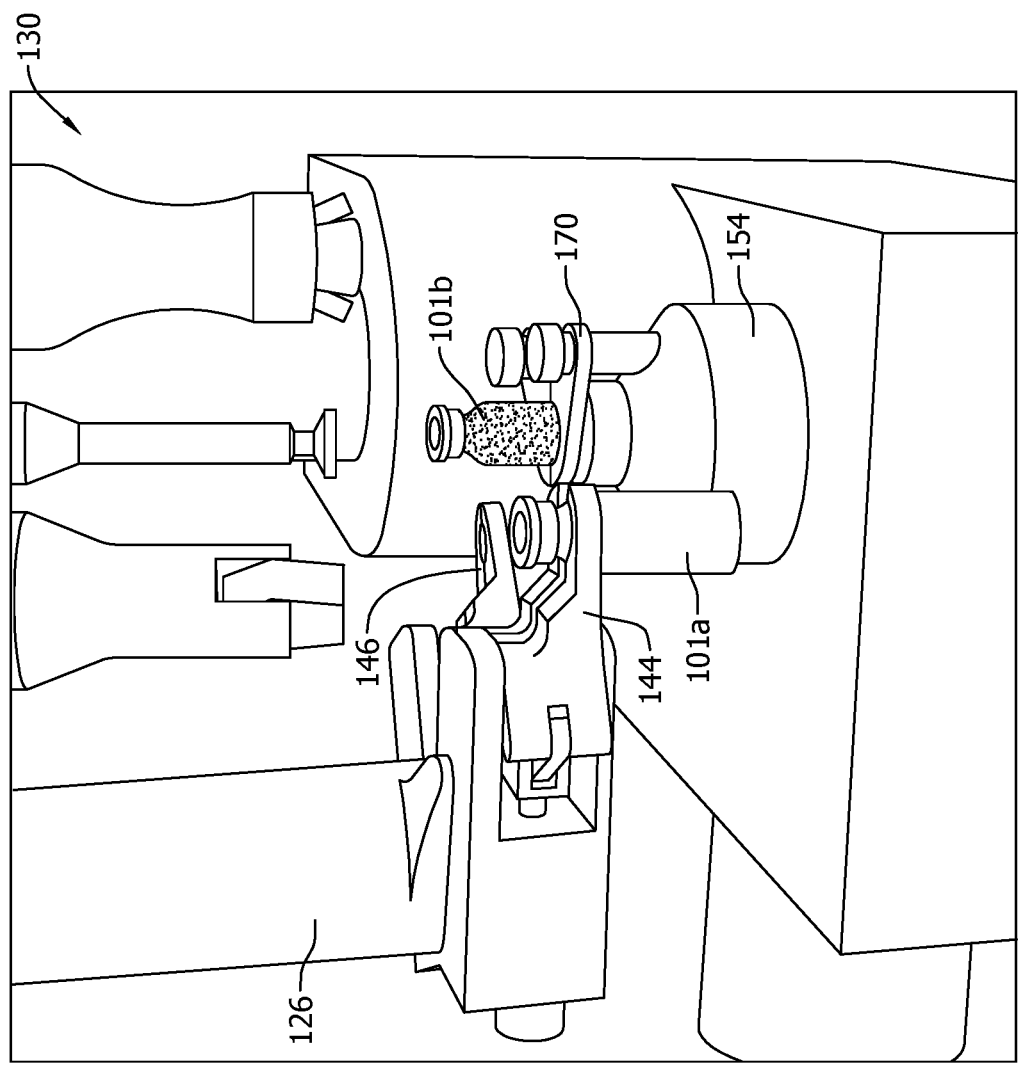
FIG. 22 is a perspective view of the dispensing unit shown in FIG. 4 showing a robotic arm retrieving the filled vial from the dispensing unit.

Referring back to FIG. 10B, after the redressing process 1020 is completed, the process 1000 proceeds to step 1008 in which the second vial 101 gripper 146 removes the filled vial 101*b* from the dispensing unit 130. As shown in FIG. 22, after the cap 176 is crimped on the filled vial 101*b*, the vial lock assembly 170 is opened to release the filled vial 101*b*, the second vial 101 gripper 146 grabs the filled vial 101*b*, and the first vial 101 gripper 144 places a new empty vial 101*a* on the pedestal 154. The dispensing process is then repeated for the empty vial 101*a* at the dispensing unit 130 while the robotic arm 126 carries the filled vial 101*b* to the dose calibrator 134, e.g., as shown in FIG. 16.

The dispensing unit 130 of the present disclosure is designed for aseptic Grade A best practices, has a fully sealed enclosure, is cleanable, and first air protected. The dispensing unit 130 uses a peristaltic, gravimetric dispense, that provides mass verification during dispensing and requires minimal setup/priming. The dispensing unit 130 is further resistant to air bubbles and has a throughput of approximately three vials 101 per minute.

Figure 23:
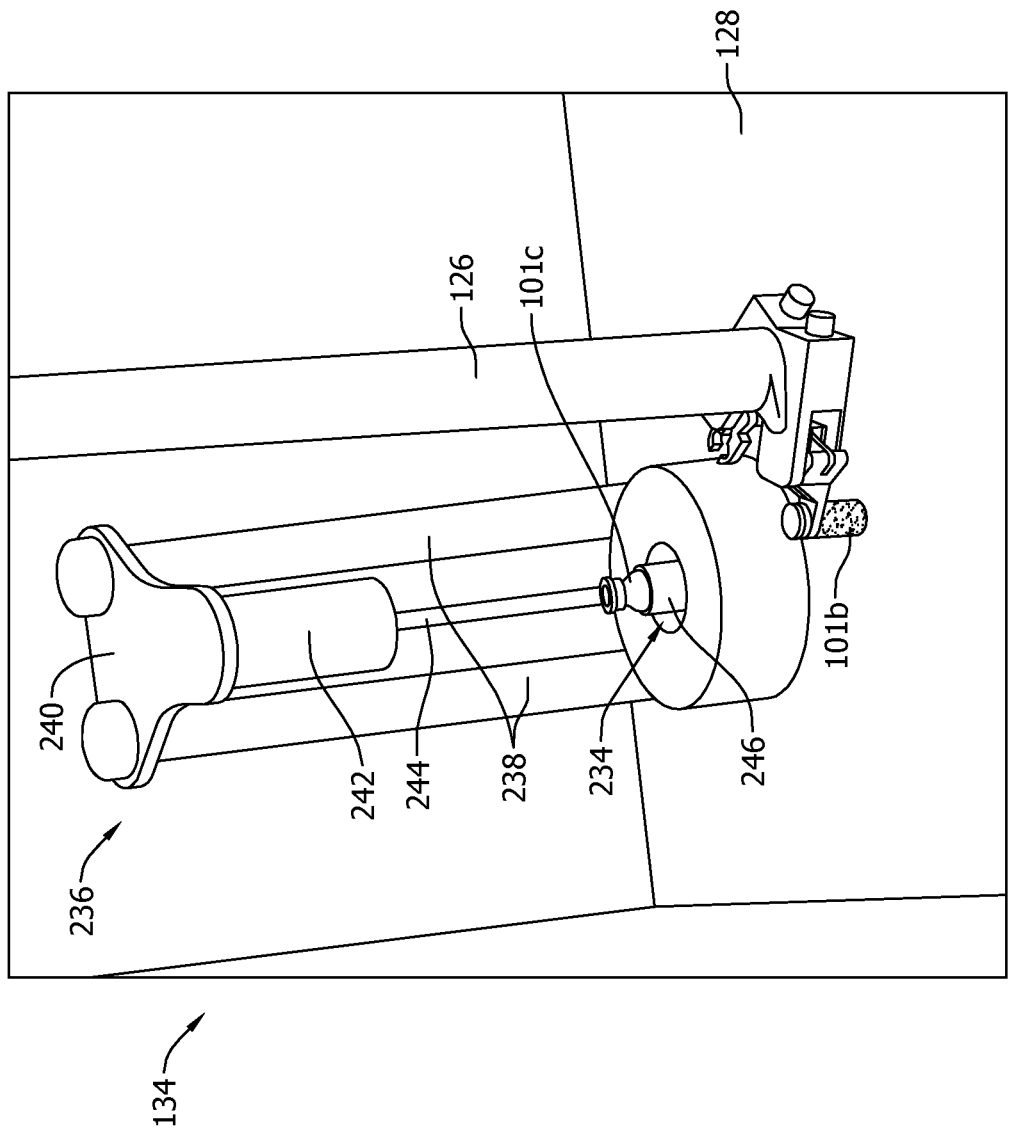
FIG. 23 is a perspective view of a dose calibrator unit of the dispensing hot cell shown in FIG. 3, showing a lift assembly in a raised position.

Referring to FIG. 10B, at a next step 1028 the filled vial 101*b* is carried to the dose calibrator 134 by the second gripper 146. Referring to FIG. 23, the dose calibrator 134 includes a radiation-shielded opening 234 that extends into a chamber well 233 (shown in FIG. 25) defined by a chamber 235 of the dose calibrator 134. The dose calibrator 134 further includes a lift assembly 236 for transporting vials 101 from the robotic arm 126 and into the chamber well 233. The lift assembly 236 includes a pair of linear actuators 238 and a branch 240 attached to the linear actuators 238. In the illustrated embodiment the linear actuators 238 are pneumatic actuators though other suitable actuators may be used.

A shielding section 242 extends downward from the branch 240 to a midsection 244. The shielding section 242 has a diameter that is substantially the same as, or slightly smaller than, the diameter of the opening 234 to prevent external background radiation from affecting radioactivity measurements within the dose calibrator chamber 235. In the example, the shielding section 242 is a block of lead or tungsten shielding that prevents external radiation from streaming down the opening 234 into the chamber well 233 and affecting vial 101 radiological measurements. The midsection 244 extends downward to a nest 246 for holding one vial 101 therein.

Figure 24:
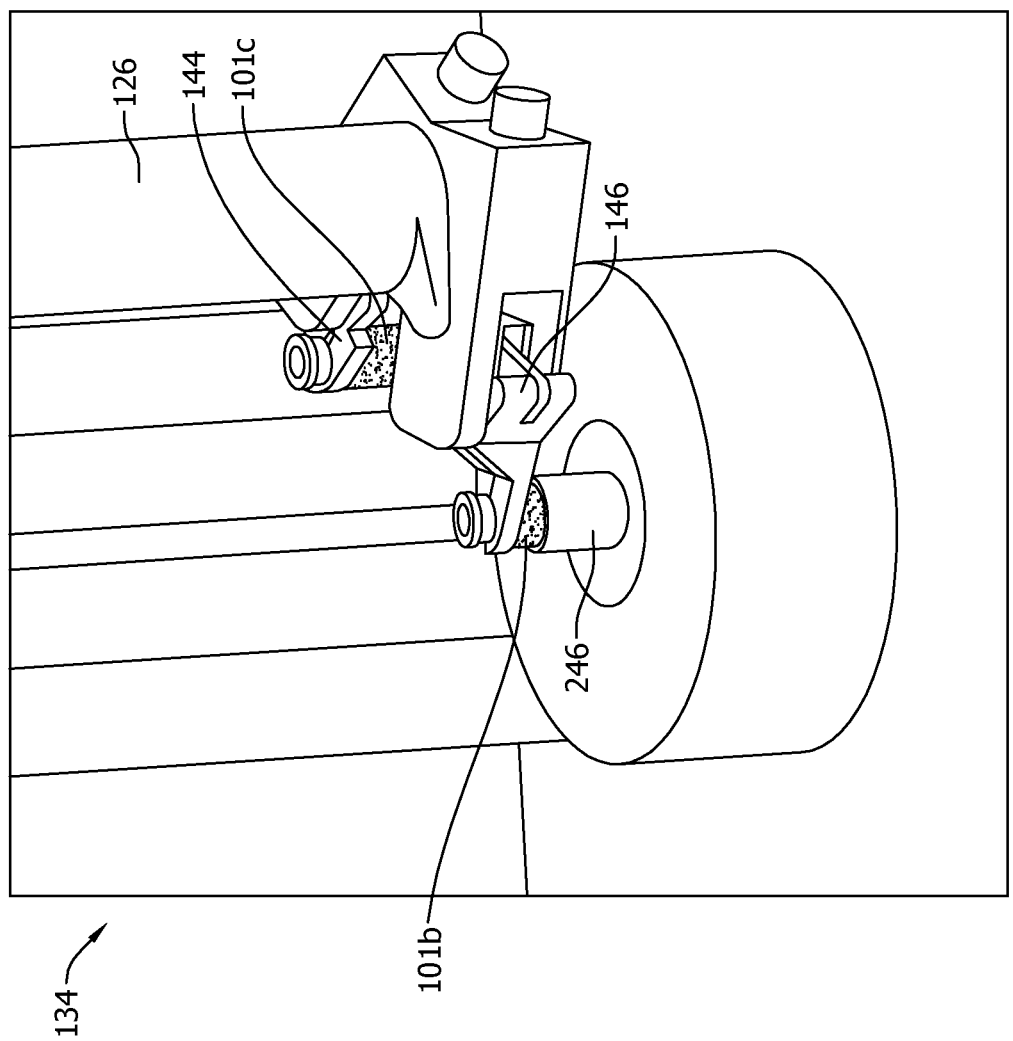
FIG. 24 is an enlarged view of a portion of the dose calibrator unit shown in FIG. 23.
Figure 25:
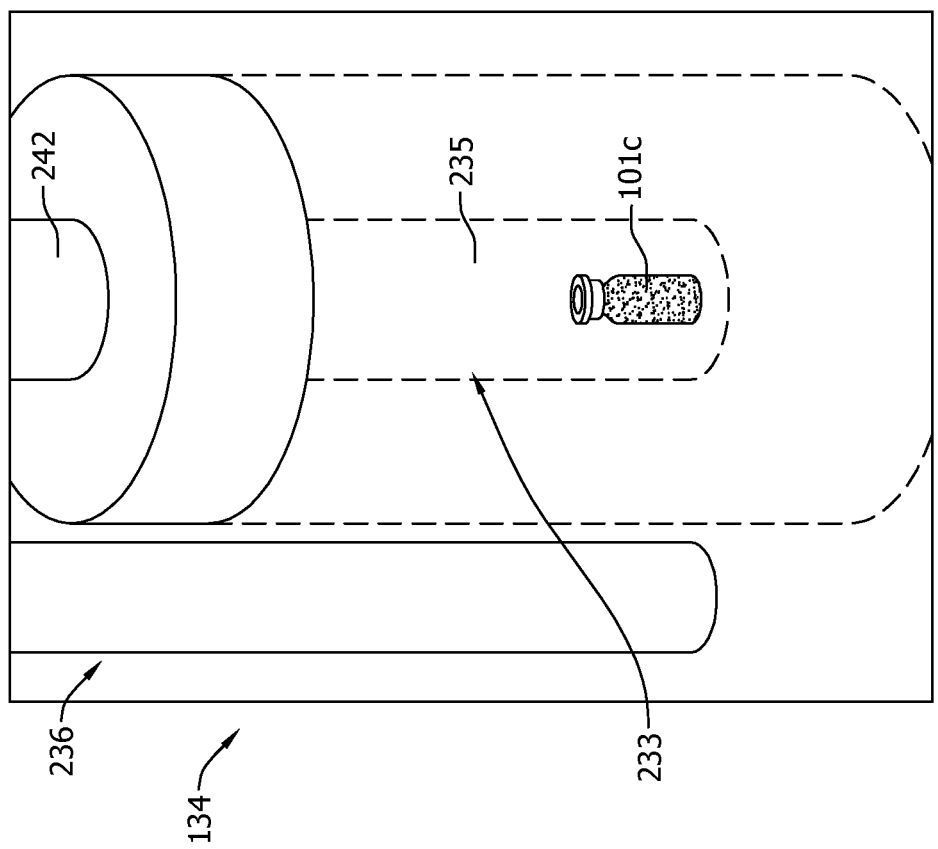
FIG. 25 is a perspective view of the dose calibrator unit shown in FIG. 23, showing the lift assembly in a lowered position and a dose calibrator chamber of the dose calibrator unit.

At step 1030, an assayed vial 101 is picked up by the robotic arm 126 from the dose calibrator 134. At step 1032, the filled vial 101*b* is deposited in the nest 246, as shown in FIG. 24. After the filled vial 101*b* is deposited in the nest 246, at step 1034, the radioactivity of the filled vial 101*b* is measured. As shown in FIG. 25, the lift assembly 236 is controlled to lower the nest 246 and vial 101 into the chamber well 233. With the vial 101 in the chamber well 233, the dose calibrator 134 measures the radioactivity of the filled vial 101*b*. In the example, the dose calibrator chamber 235 is an ionization chamber.

After the radioactivity measurement is complete, the lift assembly 236 is raised and the robotic arm 126 picks up the assayed vial 101 at step 1030. The system, or the controller 184 of the system, then determines if the measured radioactivity of the vial 101 falls within acceptable tolerance limits or not. If not, the vial 101 is rejected and placed in a rejected container (not shown).

Figure 26:
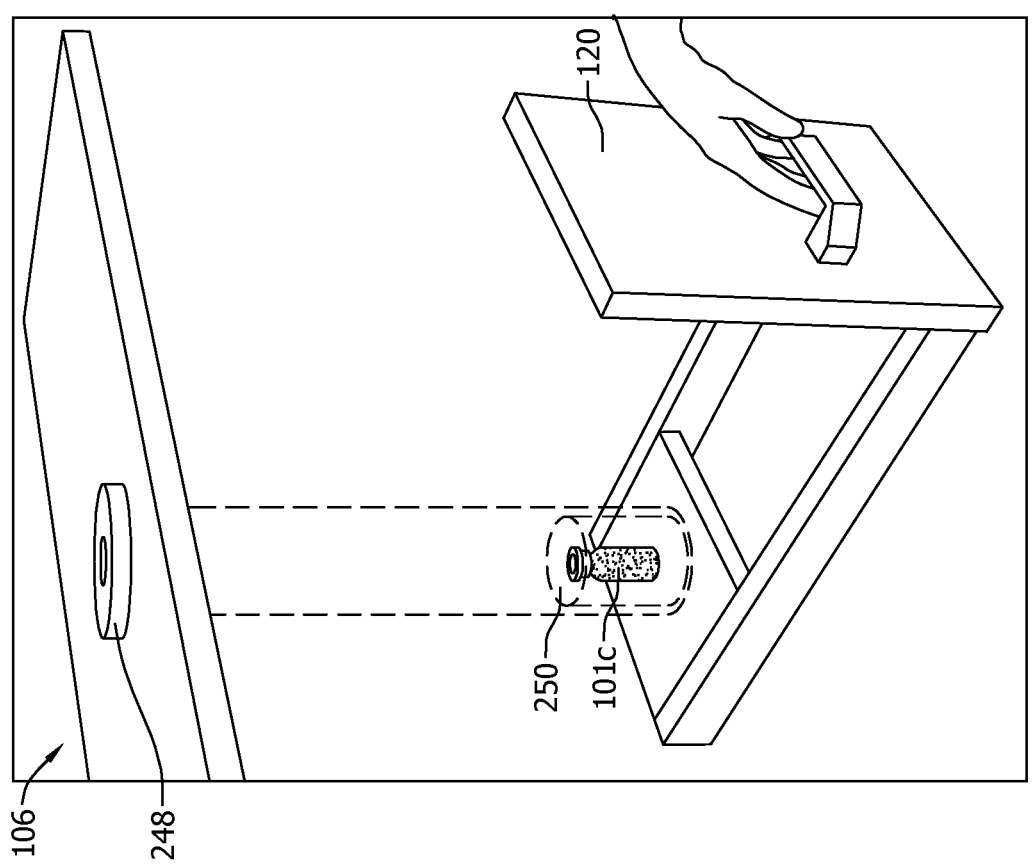
FIG. 26 is a perspective view of a drop chute and sample drawer of the dispensing hot cell shown in FIG. 3.

After the vial 101 is assayed, the process 1000 proceeds to step 1036 and it is determined whether the assayed vial 101 should be sampled. For example, during processing, some of the vials 101 in batch may be randomly sampled for quality control purposes. If the assayed vial 101 is to be sampled, the process 1000 proceeds to step 1038 and the assayed vial 101 is carried to a drop chute 248, as shown in FIG. 26. The assayed vial 101 is lowered into the drop chute 248 and released into a shielded sample container 250. In some embodiments, a lift assembly that is substantially similar to the lift assembly 236 of the dose calibrator 134 unit (shown in FIG. 23) is used to lower the assayed vial 101 in the drop chute. The shielded container 250 may then be accessed by an operator by opening the sample drawer 120 of the dispensing hot cell 106. If the vial 101 is not sampled at step 1036, the process proceeds to step 1040 during which the filled and assayed vial 101 is returned to the vial 101 tray 138 (shown in FIG. 12).

At a next step 1042, it is determined whether there are any empty vials 101 remaining at the tray 138. If there are still empty vials 101 remaining at the tray 138, the process proceeds back to step 1004 and a new empty vial 101*a* is picked up by the robotic arm 126 (shown in FIG. 12) as the filled and assayed vial 101 is returned to the tray 138. The process 1000 is then repeated until there are no more remaining empty vials 101 on the tray 138 or otherwise until a predetermined number of vials 101 have been filled. If there are not empty vials 101 remaining at the tray 138, the process 1000 proceeds to a final step 1044 of removing the tray 138 from the dispensing hot cell 106.

The dispensing units disclosed above are able to undress, fill, and redress the vials by a single mechanism provided within the hot cell. As a result, the amount of space required within the dispensing hot cell for each dispensing unit is reduced and redundant dispensing units may be provided within the dispensing hot cell. Additionally, the electronic components and sensors used for operation of each dispensing unit, with the exception of the gravimetric sensor and servomotor feedback, are provided outside of the dispensing hot cell and are communicated with respective various components of the dispensing unit by a connector. As a result, sensitive electronic components used during operation of each dispensing unit are shielded from radiation within the dispensing hot cell and a life expectancy of the dispensing unit is improved.

In some embodiments, the above-described systems and methods are electronically or computer controlled. The embodiments described herein are not limited to any particular system controller or processor for performing the processing tasks described herein. The term "controller" or "processor", as used herein, is intended to denote any machine capable of performing the calculations, or computations, necessary to perform the tasks described herein. The terms "controller" and "processor" also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the disclosure, as will be understood by those skilled in the art. The terms "controller" and "processor", as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A production system for producing a radioactive drug product comprising:
   a hot cell having a radiation isolating shielding;
   a dispensing unit positioned within the hot cell, the dispensing unit including a manipulator arm for manipulating a closure component of a vial;
   a pneumatic line extending from the manipulator arm and through the radiation isolating shielding to a location outside of the hot cell;
   a pressure sensor connected to the pneumatic line and positioned outside of the radiation isolating shielding, the pressure sensor being operable to detect air pressure within the pneumatic line; and
   a control system positioned outside of the hot cell, the control system including the pressure sensor and a controller in communication with the pressure sensor, the controller operable to control operation of the dispensing unit based on the air pressure in the pneumatic line detected by the pressure sensor, wherein the arm includes a suction cup in flow communication with the pneumatic line, the closure component including an outer cap of the vial, and wherein the controller is configured to determine whether the suction cup is engaged with the cap based on the air pressure detected by the pressure sensor.

2. The production system of claim 1, wherein the dispensing unit further comprises a body defining an interior cavity and a bulkhead connector attached to the body, the pneumatic line extending within the interior cavity, through the bulkhead connector, and out of the hot cell, the pressure sensor connected to the pneumatic line at a location outside of the hot cell.

3. A production system for producing a radioactive drug product comprising:
   a hot cell having a radiation isolating shielding;
   a dispensing unit positioned within the hot cell, the dispensing unit including a manipulator arm for manipulating a closure component of a vial;
   a pneumatic line extending from the manipulator arm and through the radiation isolating shielding to a location outside of the hot cell; and
   a pressure sensor connected to the pneumatic line and positioned outside of the radiation isolating shielding, the pressure sensor being operable to detect air pressure within the pneumatic line
   a control system positioned outside of the hot cell, the control system including the pressure sensor and a controller in communication with the pressure sensor, the controller operable to control operation of the dispensing unit based on the air pressure in the pneumatic line detected by the pressure sensor, wherein the closure component includes an outer cap of the vial and the arm includes a plurality of pneumatically actuated flanges for crimping the outer cap on the vial, and wherein the controller determines whether a crimping force applied by the flanges on the outer cap is within a predetermined range based on the detected air pressure.

4. A production system for producing a radioactive drug product comprising:
   a hot cell having a radiation isolating shielding;
   a dispensing unit positioned within the hot cell, the dispensing unit including a manipulator arm for manipulating a closure component of a vial;
   a pneumatic line extending from the manipulator arm and through the radiation isolating shielding to a location outside of the hot cell; and
   a pressure sensor connected to the pneumatic line and positioned outside of the radiation isolating shielding, the pressure sensor being operable to detect air pressure within the pneumatic line
   a control system positioned outside of the hot cell, the control system including the pressure sensor and a controller in communication with the pressure sensor, the controller operable to control operation of the dispensing unit based on the air pressure in the pneumatic line detected by the pressure sensor, wherein the manipulator arm includes a pneumatically actuated gripping device and a suction port in flow communication with the pneumatic line, the closure component including a stopper, the gripping device being operable to remove and carry the stopper from the vial with the stopper being positioned adjacent to the suction port, and wherein the controller determines whether the gripping device is engaged with the stopper based on the air pressure detected by the pressure sensor.

5. A production system for producing a radioactive drug product comprising:
   a hot cell having a radiation isolating shielding;
   a dispensing unit positioned within the hot cell, the dispensing unit including a manipulator arm for manipulating a closure component of a vial;
   a pneumatic line extending from the manipulator arm and through the radiation isolating shielding to a location outside of the hot cell; and
   a pressure sensor connected to the pneumatic line and positioned outside of the radiation isolating shielding, the pressure sensor being operable to detect air pressure within the pneumatic line
   a control system positioned outside of the hot cell, the control system including the pressure sensor and a controller in communication with the pressure sensor, the controller operable to control operation of the dispensing unit based on the air pressure in the pneumatic line detected by the pressure sensor, wherein the dispensing unit further includes:
      a pedestal including a seat for receiving the vial thereon;
      a load cell positioned within the pedestal for detecting a mass of the vial; and
      a bulkhead connector for transmitting the pneumatic line and electrical wiring from the dispensing unit to the control system, the load cell being electrically connected to the controller by the electrical wiring, and wherein the controller controls operation of the dispensing unit further based on signals received from the load cell.

6. A production system for producing a radioactive drug product comprising:
a hot cell having a radiation isolating shielding;
a dispensing unit positioned within the hot cell, the dispensing unit including a manipulator arm for manipulating a closure component of a vial;
a pneumatic line extending from the manipulator arm and through the radiation isolating shielding to a location outside of the hot cell; and
a pressure sensor connected to the pneumatic line and positioned outside of the radiation isolating shielding, the pressure sensor being operable to detect air pressure within the pneumatic line, wherein the dispensing unit further comprises:
a rotatable carriage including the manipulator arm and a filling arm positioned offset from the manipulator arm, the filling arm including a needle for dispensing the radioactive drug product into the vial and a supply tube connected to the needle;
a first servomotor operably connected to the rotatable carriage for rotating the carriage relative to the vial;
a pump coupled to the supply tube;
a second servomotor for controlling operation of the pump; and
a load cell for detecting a mass of the vial.

7. The production system of claim 6, wherein the pump is a peristaltic pump.

8. The production system of claim 6 further comprising a control system positioned outside of the hot cell, the control system including the pressure sensor and a controller in communication with the pressure sensor and the load cell, the controller operable to:
control operation of the first servomotor based on the air pressure in the pneumatic line detected by the pressure sensor and the mass of the vial detected by the load cell; and
control operation of the second servomotor based on the mass of the vial detected by the load cell.

9. The production system of claim 8, wherein the dispensing unit further comprises a bulkhead connector for transmitting the pneumatic line and a plurality of electrical lines from the dispensing unit to the control system, the plurality of electrical lines including a first electrical line connecting the first servomotor to the controller, a second electrical line connecting the second servomotor to the controller, and a third electrical line connecting the load cell to the controller.

10. A production system for producing a radioactive drug product comprising:
a hot cell having a radiation isolating shielding;
a dispensing unit positioned within the hot cell, the dispensing unit including a manipulator arm for manipulating a closure component of a vial;
a pneumatic line extending from the manipulator arm and through the radiation isolating shielding to a location outside of the hot cell;
a pressure sensor connected to the pneumatic line and positioned outside of the radiation isolating shielding, the pressure sensor being operable to detect air pressure within the pneumatic line; and a controller and a pneumatic subsystem including at least a portion of the pneumatic line and the pressure sensor, the pneumatic subsystem further comprising:
a compressor;
a vacuum generator; and
a valve fluidly connecting the compressor to the vacuum generator, wherein the controller is coupled in communication with the valve and the pressure sensor and is configured to automatically control a state of the valve based on the detected air pressure.

11. A control system for controlling a dispensing unit positioned within a hot cell having a radiation isolating shielding, the dispensing unit operable to dispense a radioactive drug into a vial and including an arm for manipulating a closure component of the vial, the control system being positioned outside of the radiation isolating shielding, the control system comprising:
a pressure sensor connected to a pneumatic line extending to the arm of the dispensing unit, the pressure sensor being operable to measure air pressure within the pneumatic line; and
a controller communicatively coupled to the pressure sensor, the controller being electrically connected to the dispensing unit and configured to control operation of the dispensing unit based on the measured air pressure, wherein the controller:
controls the arm to engage the closure component of the vial; and
determines whether the arm is engaged with the closure component based on the measured air pressure.

12. The control system of claim 11, wherein dispensing unit further includes a pump for delivering the radioactive drug into the vial, wherein the controller controls the pump to dispense the radioactive drug into the vial in response to determining that the arm is engaged with the closure component, the controller being electrically connected to a load cell positioned within the dispensing unit, the load cell being configured to measure a mass of the vial on the dispensing unit, and wherein the controller controls operation of the pump based on the mass of the vial measured by the load cell.

13. A control system for controlling a dispensing unit positioned within a hot cell having a radiation isolating shielding, the dispensing unit operable to dispense a radioactive drug into a vial and including an arm for manipulating a closure component of the vial, the control system being positioned outside of the radiation isolating shielding, the control system comprising:
a pressure sensor connected to a pneumatic line extending to the arm of the dispensing unit, the pressure sensor being operable to measure air pressure within the pneumatic line; and
a controller communicatively coupled to the pressure sensor, the controller being electrically connected to the dispensing unit and configured to control operation of the dispensing unit based on the measured air pressure, wherein the arm includes a suction cup in flow communication with the pneumatic line, the closure component including an outer cap of the vial, and wherein the controller determines whether the suction cup is engaged with the cap based on the measured air pressure.

14. A control system for controlling a dispensing unit positioned within a hot cell having a radiation isolating shielding, the dispensing unit operable to dispense a radioactive drug into a vial and including an arm for manipulating a closure component of the vial, the control system being positioned outside of the radiation isolating shielding, the control system comprising:
- a pressure sensor connected to a pneumatic line extending to the arm of the dispensing unit, the pressure sensor being operable to measure air pressure within the pneumatic line; and
- a controller communicatively coupled to the pressure sensor, the controller being electrically connected to the dispensing unit and configured to control operation of the dispensing unit based on the measured air pressure, wherein the closure component includes an outer cap of the vial and the arm includes a plurality of pneumatically actuated flanges for crimping the outer cap on the vial, and wherein the controller determines whether a crimping force applied by the flanges on the outer cap is within a predetermined range based on the measured air pressure.

15. A control system for controlling a dispensing unit positioned within a hot cell having a radiation isolating shielding, the dispensing unit operable to dispense a radioactive drug into a vial and including an arm for manipulating a closure component of the vial, the control system being positioned outside of the radiation isolating shielding, the control system comprising:
- a pressure sensor connected to a pneumatic line extending to the arm of the dispensing unit, the pressure sensor being operable to measure air pressure within the pneumatic line; and
- a controller communicatively coupled to the pressure sensor, the controller being electrically connected to the dispensing unit and configured to control operation of the dispensing unit based on the measured air pressure, wherein the arm includes a pneumatically actuated gripping device and a suction port in flow communication with the pneumatic line, the closure component including a stopper, the gripping device being operable to remove and carry the stopper from the vial with the stopper being positioned adjacent to the suction port, and wherein the controller determines whether the gripping device is engaged with the stopper based on the measured air pressure.

* * * * *